(12) United States Patent
Kawabe et al.

(10) Patent No.: US 9,574,099 B2
(45) Date of Patent: Feb. 21, 2017

(54) INK SET AND INK JET RECORDING METHOD

(71) Applicant: CANON KABUSHIKI KAISHA, Tokyo (JP)

(72) Inventors: Minako Kawabe, Koganei (JP); Hiroshi Kakikawa, Fujisawa (JP); Satoshi Takebayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/000,212

(22) Filed: Jan. 19, 2016

(65) Prior Publication Data

US 2016/0215154 A1  Jul. 28, 2016

(30) Foreign Application Priority Data

Jan. 26, 2015  (JP) .................................. 2015-012063

(51) Int. Cl.
| | |
|---|---|
| *C09D 11/322* | (2014.01) |
| *C09D 11/102* | (2014.01) |
| *C09D 11/40* | (2014.01) |
| *B41J 2/01* | (2006.01) |

(52) U.S. Cl.
CPC ........... *C09D 11/322* (2013.01); *C09D 11/102* (2013.01); *C09D 11/40* (2013.01)

(58) Field of Classification Search
CPC .............................. C09D 11/322; C09D 11/40
See application file for complete search history.

(56) References Cited

U.S. PATENT DOCUMENTS

| | | | |
|---|---|---|---|
| 6,966,944 B2 | 11/2005 | Shimomura et al. | |
| 7,208,033 B2 | 4/2007 | Kawabe et al. | |
| 7,244,299 B2 | 7/2007 | Tsuji et al. | |
| 7,297,194 B2 | 11/2007 | Shinjo et al. | |
| 7,364,770 B2 | 4/2008 | Nagashima et al. | |
| 7,445,666 B2 | 11/2008 | Yanagimachi et al. | |
| 7,618,484 B2 | 11/2009 | Fujimoto et al. | |
| 7,637,603 B2 | 12/2009 | Kawabe et al. | |
| 8,025,722 B2 | 9/2011 | Kawabe et al. | |
| 8,070,871 B2 | 12/2011 | Kawabe et al. | |
| 8,343,269 B2 | 1/2013 | Takahashi et al. | |
| 8,602,544 B2 | 12/2013 | Kawabe et al. | |
| 8,814,341 B2 | 8/2014 | Nagao et al. | |
| 8,834,621 B2 | 9/2014 | Takebayashi et al. | |
| 8,871,013 B2 | 10/2014 | Sakai et al. | |
| 9,187,662 B2 | 11/2015 | Yamamoto et al. | |
| 2002/0073892 A1* | 6/2002 | Engel ..................... | C09D 11/40 106/31.27 |
| 2004/0242726 A1* | 12/2004 | Waki ..................... | C09D 11/322 523/160 |
| 2006/0152570 A1 | 7/2006 | Ishikawa et al. | |

(Continued)

FOREIGN PATENT DOCUMENTS

| | | |
|---|---|---|
| JP | 2003-192964 A | 7/2003 |
| JP | 2007-016075 A | 1/2007 |
| JP | 2009-197141 A | 9/2009 |

*Primary Examiner* — Geoffrey Mruk
*Assistant Examiner* — Scott A Richmond
(74) *Attorney, Agent, or Firm* — Fitzpatrick, Cella, Harper & Scinto

(57) ABSTRACT

The present invention relates to an ink set enabling the recording of images that have excellent gloss clarity and abrasion resistance even when a plurality of inks are used in combination, and an ink jet recording method using the ink set.

5 Claims, 2 Drawing Sheets

(56) References Cited

U.S. PATENT DOCUMENTS

2006/0194897 A1 8/2006 Kawabe et al.
2011/0050784 A1* 3/2011 Yamamoto ............. C09D 11/30
 347/20
2013/0328973 A1 12/2013 Kakikawa et al.

* cited by examiner

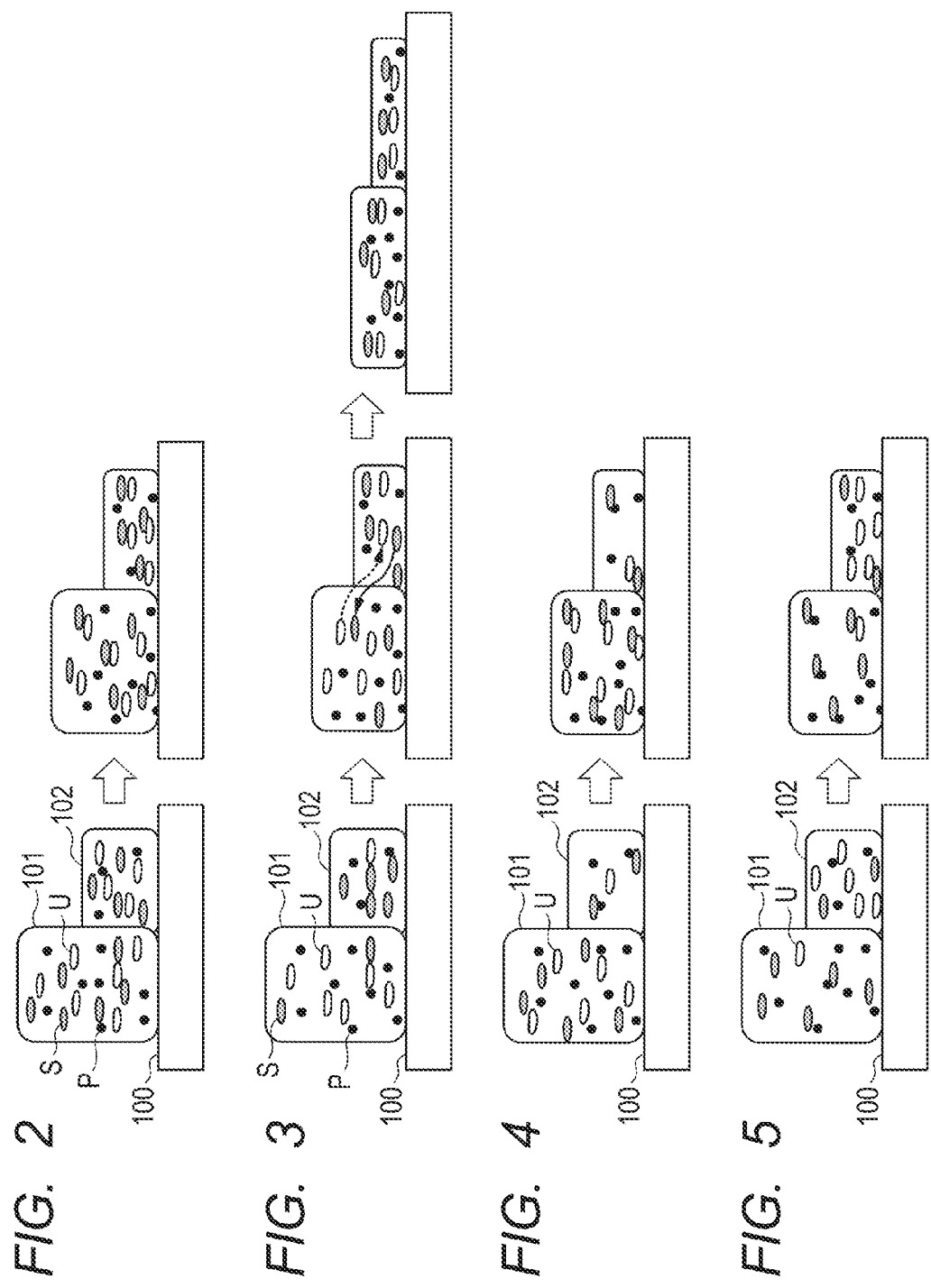

INK SET AND INK JET RECORDING METHOD

BACKGROUND OF THE INVENTION

Field of the Invention

The present invention relates to an ink set and an ink jet recording method using the ink set.

Description of the Related Art

In recent years, an ink jet recording method has enabled the recording of images having high definition and high color developability that are almost equivalent to those achieved by silver halide photography and offset printing. The coloring materials used in inks include dyes and pigments, and the pigments are widely used from the viewpoint of image toughness such as gas resistance, light resistance, and water resistance.

It is generally known that when an ink containing the pigment as the coloring material is used, a formed pigment layer has an uneven surface, and thus the gloss clarity of images deteriorate. When recorded images are carried or are stacked and stored, recording media are rubbed with each other in some cases. The surface of an image may be scratched by comparatively weak force generated in such a case, and the glossiness may be changed. On this account, there is a need to improve abrasion resistance (light abrasion resistance) of images recorded with pigment inks. A recent increase in recording speed is likely to shorten the time from the discharging of a recording medium to the overlapping with another recording medium on a stacking tray of an ink jet recording apparatus. On this account, there is another need to provide an ink enabling the recording of images that have higher abrasion resistance and are unlikely to be scratched even in a condition in which recording media are rubbed with each other immediately after recording.

To satisfy these needs, for example, an ink containing vinyl polymer particles, polyurethane polymer particles, and a water-insoluble organic compound has been disclosed. The ink enables the recording of images having excellent glossiness, gloss clarity, and fixability (Japanese Patent Application Laid-Open No. 2007-016075). Separately, an ink containing C.I. Pigment Orange 242, an aqueous medium, a copolymer resin of a hydrophobic monomer and a hydrophilic monomer, and a urethane resin has been disclosed. The ink enables the recording of images that achieve both glossiness and suppression of discoloration after storage at high temperature (Japanese Patent Application Laid-Open No. 2009-197141). An ink containing a predetermined resin and a polyether-modified organosiloxane has also been disclosed. The ink enables the recording of images having higher abrasion resistance and higher scratch resistance (Japanese Patent Application Laid-Open No. 2003-192964).

The inventors of the present invention have studied the inks containing a urethane resin and the like as disclosed in Japanese Patent Application Laid-Open No. 2007-016075 and Japanese Patent Application Laid-Open No. 2009-197141 and have found that recorded images have good gloss clarity but insufficient abrasion resistance. The inventors have also studied the ink containing a polyether-modified organosiloxane as disclosed in Japanese Patent Application Laid-Open No. 2003-192964 and have found that the recorded images have abrasion resistance improved to some extent but have insufficient gloss clarity. The inventors have prepared an ink containing a water-soluble urethane resin and a polyether-modified organosiloxane and have studied the effect by combination use of these two components. The result has revealed that the ink enables the recording of images having both good gloss clarity and good abrasion resistance. The result, however, has revealed that when a plurality of inks containing the above two components are used in combination to record images while the inks come in contact with each other or partly overlap with each other, the abrasion resistance is good, but the gloss clarity markedly deteriorate.

An object of the present invention is thus to provide an ink set enabling the recording of images having excellent gloss clarity and abrasion resistance even when a plurality of inks are used in combination. Another object of the present invention is to provide an ink jet recording method using the ink set.

SUMMARY OF THE INVENTION

The above object is achieved by the following present invention. That is, the present invention provides an aqueous ink set including a combination of a first ink and a second ink. The first ink contains a pigment, a resin dispersant, and a water-soluble urethane resin, and the second ink contains a pigment, a resin dispersant, and a water-soluble urethane resin. The second ink further contains a polyether-modified siloxane compound having a weight-average molecular weight of 10,000 or more to 50,000 or less. A content $P_1$ (% by mass) of the pigment in the first ink is larger than a content $P_2$ (% by mass) of the pigment in the second ink. A content $U_1$ (% by mass) of the water-soluble urethane resin in the first ink is larger than a content $U_2$ (% by mass) of the water-soluble urethane resin in the second ink. A content $S_1$ (% by mass) of a polyether-modified siloxane compound in the first ink is smaller than a content $S_2$ (% by mass) of the polyether-modified siloxane compound in the second ink.

According to the present invention, even when a plurality of inks are used in combination, an ink set enabling the recording of images that have excellent gloss clarity and abrasion resistance can be provided. According to the present invention, an ink jet recording method using the ink set can also be provided.

Further features of the present invention will become apparent from the following description of exemplary embodiments with reference to the attached drawings.

BRIEF DESCRIPTION OF THE DRAWINGS

FIG. 1A is a perspective view of a principal part of the ink jet recording apparatus; and FIG. 1B is a perspective view of a head cartridge.

FIG. 2 is a schematic view illustrating dots of a first ink and a second ink that satisfy the relations, $U_1=U_2$ and $S_1=S_2$.

FIG. 3 is a schematic view illustrating dots of a first ink and a second ink that satisfy the relations, $U_1>U_2$ and $S_1<S_2$.

FIG. 4 is a schematic view illustrating dots of a first ink and a second ink that satisfy the relations, $U_1>U_2$ and $S_1>S_2$.

FIG. 5 is a schematic view illustrating dots of a first ink and a second ink that satisfy the relations, $U_1<U_2$ and $S_1>S_2$.

DESCRIPTION OF THE EMBODIMENTS

Figure 1A:
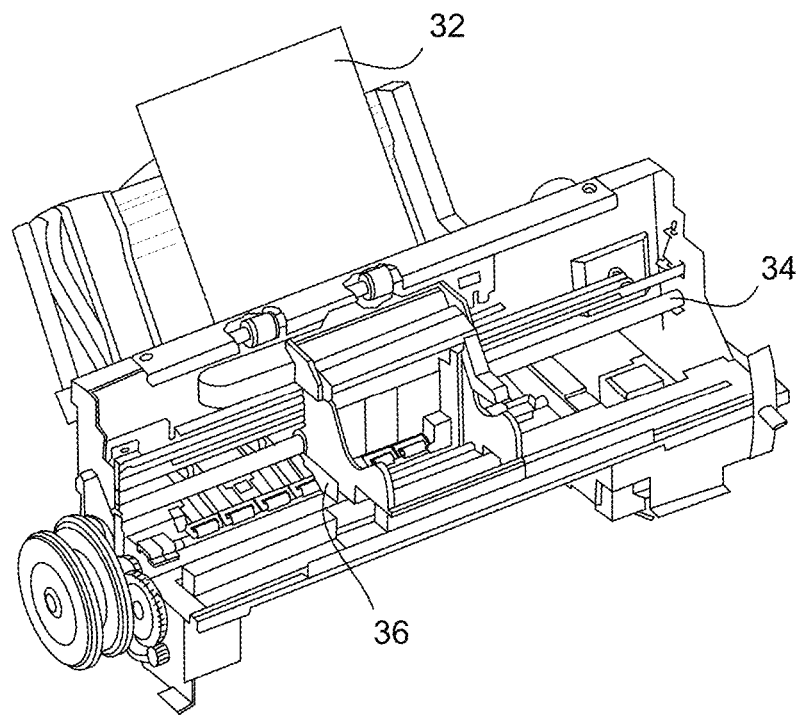
FIGS. 1A and 1B are schematic views illustrating an exemplary ink jet recording apparatus used for an ink jet recording method of the present invention.

The present invention will now be described in detail with reference to preferred embodiments. An aqueous ink is also simply called "ink". Various physical property values in the present invention are the values determined at 25° C. unless otherwise noted.

The inventors of the present invention have first studied the reason why a plurality of inks having different pigment contents are used in combination to record images that fails to satisfy both the gloss clarity and the abrasion resistance. Hereinafter, the ink having comparatively large pigment content ($P_1$) is called a first ink, and the ink having comparatively small pigment content ($P_2$) is called a second ink. The contents of a water-soluble urethane resin in the first ink and the second ink are defined as $U_1$ and $U_2$, respectively, and the contents of a polyether-modified siloxane compound in the first ink and the second ink are defined as $S_1$ and $S_2$, respectively.

In order to improve the gloss clarity, it is required that the surface energy of dots is increased to mix a first ink dot and a second ink dot with each other and the dots are allowed to spread and to be fixed without level differences. To achieve this, it is effective to add a water-soluble urethane resin to an ink. In order to improve the abrasion resistance, it is preferred to reduce the surface energy of dots (pigment layer) to achieve high slippability. To achieve this, it is effective to add a polyether-modified siloxane compound having an appropriate weight-average molecular weight to an ink as the component for reducing the surface energy of dots. However, when the surface energy of dots of a first ink and a second ink having different pigment contents is reduced to achieve high slippability, a subsequently applied dot is fixed in such a way as to repel a previously fixed dot to cause a level difference, and the dots are difficult to mix with each other.

FIG. 2 is a schematic view illustrating dots of a first ink and a second ink that satisfy the relations, $U_1=U_2$ and $S_1=S_2$. When a first ink and a second ink each containing a water-soluble urethane resin U and a polyether-modified siloxane compound S are used in combination to record an image, a first ink dot 101 and second ink dot 102 are formed on a recording medium 100. The respective dots would be mixed with each other and be spread due to the water-soluble urethane resin U. However, the polyether-modified siloxane compound S concurrently functions to give a repelling power between the first ink dot 101 and the second ink dot 102. As a result, the respective dots are not sufficiently mixed and fail to spread, and thus a level difference is generated between the dots. When a plurality of inks having the same pigment content are used, the level difference generated between dots is not so large, and thus the gloss clarity do not deteriorate so much. In contrast, when a first ink and a second ink having different pigment P contents are used, a larger level difference is formed between dots to give a more noticeable unevenness, and thus the gloss clarity deteriorate markedly.

To intend to satisfy both the gloss clarity and the abrasion resistance, the inventors have studied a technique of mixing dots by a water-soluble urethane resin to allow the dots to spread and of leaving a polyether-modified siloxane compound on the dot surface to improve the abrasion resistance of images. The molecular structure of the water-soluble urethane resin includes a unit capable of forming a hydrogen bond typified by a urethane bond. The unit forms a hydrogen bond with a polyalkylene oxide structure in the molecular structure of the polyether-modified siloxane compound. On this account, the water-soluble urethane resin is supposed to interact with the polyether-modified siloxane compound due to the characteristics of these molecular structures. By utilizing such an interaction, the water-soluble urethane resin and the polyether-modified siloxane compound can be efficiently diffused across dots, and the polyether-modified siloxane compound can be left on the dot surface while the dots are allowed to spread.

The ink set of the present invention includes a combination of a first ink having comparatively large pigment content and a second ink having comparatively small pigment content. The content $U_1$ of the water-soluble urethane resin in the first ink is larger than the content $U_2$ of the water-soluble urethane resin in the second ink ($U_1>U_2$). The content $S_1$ of the polyether-modified siloxane compound in the first ink is smaller than the content $S_2$ of the polyether-modified siloxane compound in the second ink ($S_1<S_2$). When the first ink and the second ink having different pigment contents are adjacent to each other or partly overlap with each other, or the respective ink dots come in contact with each other, the dots have high surface energy immediately after the formation of the dots because each ink contains the water-soluble urethane resin. Accordingly, the adjacent dots are mixed with each other.

FIG. 3 is a schematic view illustrating dot of a first ink and a second ink that satisfy the relations, $U_1>U_2$ and $S_1<S_2$. On the recording medium 100, when the first ink dot 101 and the second ink dot 102 are mixed with each other, the water-soluble urethane resin U and the polyether-modified siloxane compound S interact with each other and thus move and diffuse across the respective dots. Specifically, the water-soluble urethane resin U in the first ink diffuses toward the second ink dot having a larger content of the polyether-modified siloxane compound S. The polyether-modified siloxane compound S in the second ink diffuses toward the first ink dot having a larger content of the water-soluble urethane resin U. Hence, both the water-soluble urethane resin U and the polyether-modified siloxane compound S diffuse across the first ink dot 101 and the second ink dot 102. Accordingly, the polyether-modified siloxane compound S can be left on the dot surface while the dots are allowed to spread. In addition, it is supposed that the water-soluble urethane resin U and the polyether-modified siloxane compound S are allowed to diffuse in counter directions, and thus the respective dots effectively spread without repelling. Through such a mechanism, the ink set of the present invention enables the recording of images having excellent gloss clarity and abrasion resistance even when a first ink and a second ink having different pigment contents are used in combination. Also due to concentration equilibration, the water-soluble urethane resin diffuses from the first ink dot to the second ink dot, while the polyether-modified siloxane compound diffuses from the second ink dot to the first ink dot. However, the diffusion speed by the interaction is higher than the diffusion speed by the concentration equilibration.

It is not enough that the first ink and the second ink have concentration gradients of the water-soluble urethane resin and the polyether-modified siloxane compound. FIG. 4 is a schematic view illustrating dots of a first ink and a second ink that satisfy the relations, $U_1>U_2$ and $S_1>S_2$. When both contents of the water-soluble urethane resin and the polyether-modified siloxane compound are larger in the first ink, the first ink dot 101 and the second ink dot 102 spread due to the water-soluble urethane resin U and start to be mixed on the recording medium 100. However, the water-soluble urethane resin U completely interacts with the polyether-modified siloxane compound S in the first ink, and thus the diffusion of the water-soluble urethane resin U and the polyether-modified siloxane compound S by interaction is not caused. Accordingly, the polyether-modified siloxane compound S functions to repel the dots, thus the gloss clarity of images deteriorate, and the abrasion resistance is unlikely to be improved.

A case in which the content $U_1$ of the water-soluble urethane resin in the first ink, the content $U_2$ of the water-soluble urethane resin in the second ink, the content $S_1$ of the polyether-modified siloxane compound in the first ink, and the content $S_2$ of the polyether-modified siloxane compound in the second ink satisfy the relations, "$U_1<U_2$" and "$S_1>S_2$" is supposed. In this case, images having excellent gloss clarity and abrasion resistance cannot be recorded. The inventors assume the following reason for this.

FIG. 5 is a schematic view illustrating dots of a first ink and a second ink that satisfy the relations, $U_1<U_2$ and $S_1>S_2$. A polyalkylene oxide moiety in the molecular structure of the polyether-modified siloxane compound is supposed to interact with a pigment P or a resin dispersant to some extent due to the structure thereof. The polyether-modified siloxane compound in the first ink is in such a state as to interact with a coexistent pigment, a resin dispersant, and a water-soluble urethane resin. On this account, even when the first ink dot 101 and the second ink dot 102 are mixed with each other on the recording medium 100, the polyether-modified siloxane compound S in the first ink does not interact with the water-soluble urethane resin U and thus does not diffuse toward the second ink dot 102. Accordingly, it is supposed that images having excellent gloss clarity and abrasion resistance cannot be recorded.

The method of mixing a first ink dot and a second ink dot with each other on a recording medium includes a method of making the first ink and the second ink have different surface tensions. However, when the difference in surface tension is used to mix a plurality of dots with each other on a recording medium, bleeding is likely to be caused, and thus image quality deteriorates in some cases. The present invention adopts the method of using the concentration gradient to diffuse components in inks but a dynamic method of using the difference in surface tension of inks, and thus the gloss clarity and the abrasion resistance can be improved without deterioration of image quality.

Here, in order to mix a first ink dot and a second ink dot with each other to allow the dots to spread and to left a polyether-modified siloxane compound on the dot surface, the polyether-modified siloxane compound is required to have a weight-average molecular weight of 10,000 or more to 50,000 or less. If the polyether-modified siloxane compound has a weight-average molecular weight of less than 10,000, only a few siloxane bonds are present in the structure of the polyether-modified siloxane compound, and thus the abrasion resistance cannot be improved. In addition, a few moieties are also present to interact with the water-soluble urethane resin, and thus the improvement effect of the gloss clarity is reduced in some cases. If having a weight-average molecular weight of more than 50,000, the polyether-modified siloxane compound interacts weakly with a water-soluble urethane resin due to steric hindrance, and thus the gloss clarity cannot be improved.

<Ink Set>

The ink set of the present invention is an aqueous ink set including a combination of a first ink and a second ink. Each of the first ink and the second ink contains a pigment, a resin dispersant, and a water-soluble urethane resin. The second ink further contains a polyether-modified siloxane compound. The first ink and the second ink may have the same hue or different hues. In the present invention, the first ink and the second ink having "the same hue" means that the first ink and the second ink are classified into the same hue within the range of hues classified into, for example, black and colors. The first ink and the second ink having "different hues" means that the first ink and the second ink are classified into different hues within the range of hues classified into, for example, black and colors. Examples of the hue of color include cyan, magenta, yellow, red, green, and blue. The first ink and the second ink are not required to undergo a reaction or to increase the viscosity when coming in contact with each other. In other words, each ink is not required to contain a reaction agent or a thickener. Components contained in the inks constituting the ink set of the present invention, physical properties of the inks, and the like will next be described in detail.

(Pigment)

Each of the first ink and the second ink constituting the ink set of the present invention contains a pigment as a coloring material. The content $P_1$ (% by mass) of the pigment in the first ink is required to be larger than the content $P_2$ (% by mass) of the pigment in the second ink. The pigment is exemplified by inorganic pigments such as carbon black and organic pigments, which are well-known in the art. Among the inorganic pigments, it is preferred that no white pigment be contained in the ink because the color developability of recorded images slightly deteriorate in some cases. In each ink, the content (% by mass) of the pigment is preferably 0.05% by mass or more to 15.00% by mass or less and more preferably 0.10% by mass or more to 10.00% by mass or less based on the total mass of the corresponding ink. The content $P_1$ (% by mass) of the pigment in the first ink is preferably 2.00% by mass or more to 10.00% by mass or less based on the total mass of the first ink. The content $P_2$ (% by mass) of the pigment in the second ink is preferably 0.10% by mass or more to 2.00% by mass or less based on the total mass of the second ink.

The type of the pigment in the first ink may be the same as or different from the type of the pigment in the second ink. In other words, the two inks are not required to have the same hue. However, the two inks preferably contain the same pigment and have the same hue because such inks enable the recording of images having excellent gloss clarity and abrasion resistance. This is because the interaction between the polyether-modified siloxane compound and the pigment and the resin dispersant that are components interfering with the interaction between the water-soluble urethane resin and the polyether-modified siloxane compound is equivalent between the first ink and the second ink. In the present invention, "the types of pigments being the same" means pigments have the same chemical structure. In other words, in the case of carbon black, even when physical properties such as particle size are different, such carbon blacks are considered as the "types of pigments being the same". In the case of organic pigments, when color index numbers (what is called C.I. numbers) are the same, organic pigments are considered as the "types of pigments being the same" even when physical properties such as particle size are different.

(Resin Dispersant)

Each of the first ink and the second ink constituting the ink set of the present invention contains a resin dispersant for dispersing the pigment in the corresponding ink. The resin dispersant is preferably a resin having a hydrophilic unit and a hydrophobic unit as constitution units. The resin dispersant is preferably a water-soluble acrylic resin at least having an acrylic component such as a unit derived from (meth)acrylic acid and a unit derived from a (meth)acrylate ester. The "water-soluble acrylic resin" means a resin capable of being dissolved in an aqueous medium that is a mixed solvent of water and a water-soluble organic solvent and capable of being present in an aqueous medium in the form without any particle size. Whether the acrylic resin is water-soluble can be specifically determined by the same procedure as in the case of the following water-soluble urethane resin. In the below description, "(meth)acrylic" means "acrylic" and "methacrylic", and "(meth)acrylate" means "acrylate" and "methacrylate".

The hydrophilic unit (unit having a hydrophilic group such as acid groups and a hydroxy group) can be formed by polymerizing a monomer having a hydrophilic group, for example. Specific examples of the monomer having a hydrophilic group include anionic monomers including acidic monomers having a carboxy group, such as (meth)acrylic acid, itaconic acid, maleic acid, and fumaric acid and anhydrides and salts of these acidic monomers; monomers having a hydroxy group, such as 2-hydroxyethyl (meth)acrylate and 3-hydroxypropyl (meth)acrylate; and monomers having an ethylene oxide group, such as methoxy (mono, di, tri, poly)ethylene glycol (meth)acrylates. Examples of the cation constituting the salt of an anionic monomer include a lithium ion, a sodium ion, a potassium ion, an ammonium ion, and organic ammonium ions.

The resin dispersant used in each ink preferably has an acid value, and accordingly, the hydrophilic unit preferably contains a unit derived from the above-mentioned anionic monomer. The resin dispersant typically exhibits water-solubility when being neutralized with a neutralizer such as hydroxides of alkali metals (for example, lithium, sodium, and potassium) and aqueous ammonia.

The hydrophobic unit (unit not having a hydrophilic group such as acid groups and a hydroxy group) can be formed by polymerizing a monomer having a hydrophobic group, for example. Specific examples of the monomer having a hydrophobic group include monomers having an aromatic ring, such as styrene, α-methylstyrene, and benzyl (meth)acrylate; and monomers having an aliphatic group, such as ethyl (meth)acrylate, methyl (meth)acrylate, (iso)propyl (meth)acrylate, (n-, iso-, t-)butyl (meth)acrylates, and 2-ethylhexyl (meth)acrylate.

The resin dispersant preferably has a weight-average molecular weight of 1,000 or more to 30,000 or less and more preferably 3,000 or more to 15,000 or less. The weight-average molecular weight of the resin dispersant can be determined by size exclusion chromatography (GPC method) in accordance with JIS Handbook, Chemical analysis K0124. The resin dispersant preferably has an acid value of 50 mg KOH/g or more to 300 mg KOH/g or less and more preferably 100 mg KOH/g or more to 250 mg KOH/g or less. The acid value of the resin dispersant can be determined by potentiometric titration.

In each ink, the content (% by mass) of the resin dispersant is preferably 0.01% by mass or more to 5.00% by mass or less and more preferably 0.02% by mass or more to 3.00% by mass or less based on the total mass of the corresponding ink. In each ink, the mass ratio of the content (% by mass) of the pigment relative to the content (% by mass) of the resin dispersant is preferably 0.30 times or more to 10.0 times or less.

(Water-Soluble Urethane Resin)

Each of the first ink and the second ink constituting the ink set of the present invention contains a water-soluble urethane resin. Each ink contains the water-soluble urethane resin, and thus dots coming in contact with each other are allowed to efficiently spread. In the present invention, the "water-soluble urethane resin" means a urethane resin capable of being dissolved in an aqueous medium that is a mixed solvent of water and a water-soluble organic solvent and capable of being present in an aqueous medium in the form without any particle size.

Whether the urethane resin is water-soluble can be determined by the following procedure. First, by neutralization with an alkali (such as sodium hydroxide and potassium hydroxide) in an amount corresponding to the acid value, a liquid containing a resin (resin solid content: 10% by mass) is prepared. Next, the prepared liquid is diluted 10-fold (in terms of volume) with pure water to prepare a sample solution. The particle size of the resin in the sample solution is then determined by dynamic light scattering. When particles having particle sizes are not observed, such a resin can be determined to be water-soluble. The conditions for the measurement are as follows.

[Measurement Conditions]
SetZero: 30 seconds
Number of measurements: three times
Measurement time: 180 seconds As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions, and the like are not limited to the above.

If a urethane resin capable of being present in an aqueous medium in the form with a particle size, such as a urethane resin emulsion or a water-dispersible urethane resin, is used, film formability sufficient for improving the gloss clarity cannot be achieved. A urethane resin capable of being present in an aqueous medium in the form with a particle size has many hydrophobic moieties as compared with water-soluble urethane resins. On this account, the interaction with a polyether-modified siloxane compound is likely to be reduced.

In each ink, the content (% by mass) of the water-soluble urethane resin is preferably 0.01% by mass or more to 5.00% by mass or less based on the total mass of the corresponding ink. In the first ink, the content $U_1$ (% by mass) of the water-soluble urethane resin ink is preferably 0.10% by mass or more to 2.00% by mass or less and more preferably 0.30% by mass or more to 1.50% by mass or less based on the total mass of the first ink. In the second ink, the content $U_2$ (% by mass) of the water-soluble urethane resin is preferably 0.01% by mass or more to 0.50% by mass or less and more preferably 0.05% by mass or more to 0.20% by mass or less based on the total mass of the second ink.

In the present invention, the content $U_1$ (% by mass) of the water-soluble urethane resin in the first ink is required to be larger than the content $U_2$ (% by mass) of the water-soluble urethane resin in the second ink. The difference between the content $U_1$ (% by mass) of the water-soluble urethane resin in the first ink and the content $U_2$ (% by mass) of the water-soluble urethane resin in the second ink ($U_1-U_2$) is more preferably 0.10% by mass or more. If the difference in content of the water-soluble urethane resin ($U_1-U_2$) is less than 0.10% by mass, the polyether-modified siloxane compound requiring interaction diffuses more slowly, and the effect of improving the abrasion resistance of images is reduced in some cases. In addition, the water-soluble urethane resin also diffuses more slowly, and the effect of improving the gloss clarity of images is also reduced in some cases. The difference in content of the water-soluble urethane resin ($U_1-U_2$) is preferably 0.50% by mass or less and more preferably 0.40% by mass or less.

The type of the water-soluble urethane resin in the first ink may be the same as or different from the type of the water-soluble urethane resin in the second ink. However, the two inks preferably contain the same water-soluble urethane resin. When two inks contain the same water-soluble urethane resin, the efficiency of interaction between the water-soluble urethane resin and the polyether-modified siloxane compound becomes equivalent between the first ink and the second ink, and the diffusion speed of the water-soluble urethane resin is likely to be constant. Accordingly, dot heights are more likely to be uniform, and the gloss clarity can be further improved. The same water-soluble urethane resin means that the types of constitution units of each resin, the acid value, and the weight-average molecular weight are the same.

The water-soluble urethane resin can be prepared by reacting a polyisocyanate with a polyol, for example. The water-soluble urethane resin can be prepared by further reacting a chain extender. The water-soluble urethane resin can also be a hybrid resin prepared by bonding a urethane resin to another resin.

As the polyisocyanate, an aliphatic polyisocyanate or an aromatic polyisocyanate can be used, for example. Specific examples of the aliphatic polyisocyanate include polyisocyanates having a chain structure, such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane 1,5-diisocyanate, and 3-methylpentane 1,5-diisocyanate; and polyisocyanates having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanate methyl) cyclohexane.

Specific examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate, and $\alpha,\alpha,\alpha',\alpha'$-tetramethylxylylene diisocyanate.

As the polyol, long-chain polyols having a number-average molecular weight of about 450 to 4,000, such as polyether polyols, polyester polyols, and polycarbonate polyols; and short-chain polyols such as polyols having a hydrophilic group are usable. It is preferred to use a water-soluble urethane resin synthesized by using a polyether polyol specifically selected from the long-chain polyols. The water-soluble urethane resin synthesized by using a polyether polyol enables the recording of images having excellent abrasion resistance and gloss clarity as compared with a water-soluble urethane resin synthesized by using a polyester polyol or a polycarbonate polyol. This is because the polyalkylene oxide structure of the polyether polyol particularly efficiently interacts with a polyether-modified siloxane compound.

Examples of the polyether polyol include addition polymers of alkylene oxides and polyols; and glycols such as (poly)alkylene glycols. Examples of the alkylene oxide include ethylene oxide, propylene oxide, butylene oxide, and α-olefin oxides. Examples of the polyols to be subjected to addition polymerization with the alkylene oxide include diols such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenylpropane, 4,4-dihydroxyphenylmethane, hydrogenated bisphenol A, dimethylolurea, and derivatives thereof; and triols such as glycerol, trimethylolpropane, 1,2,5-hexanetriol, 1,2,6-hexanetriol, pentaerythritol, trimethylol melamine and derivatives thereof, and polyoxypropylenetriol. Examples of the glycols include (poly)alkylene glycols such as hexamethylene glycol, tetramethylene glycol, ethylene glycol, diethylene glycol, triethylene glycol, tetraethylene glycol, polyethylene glycol, propylene glycol, dipropylene glycol, tripropylene glycol, polypropylene glycol, (poly)tetramethylene glycol, and neopentyl glycol; and ethylene glycol-propylene glycol copolymers.

Examples of the polyester polyol include acid esters. Examples of the acid component constituting the acid esters include aromatic dicarboxylic acids such as phthalic acid, naphthalenedicarboxylic acid, biphenyldicarboxylic acid, and tetrahydrophthalic acid; alicyclic dicarboxylic acids such as hydrogenated products of the aromatic dicarboxylic acids; and aliphatic dicarboxylic acids such as malonic acid, succinic acid, tartaric acid, oxalic acid, glutaric acid, adipic acid, pimelic acid, suberic acid, azelaic acid, sebacic acid, alkyl succinic acids, linoleic acid, maleic acid, fumaric acid, mesaconic acid, citraconic acid, and itaconic acid. Anhydrides, salts, and derivatives (including alkyl esters and acid halides) thereof are also usable as the acid component, for example. Examples of the component to form an ester with the acid component include polyols such as diols and triols; and glycols such as (poly)alkylene glycols. Examples of the polyols and the glycols include those exemplified as the components constituting the above polyether polyol.

As the polycarbonate polyol, a polycarbonate polyol produced by a known method can be used. Specific examples of the polycarbonate polyol include alkane diol polycarbonate diols such as polyhexamethylene carbonate diol. Other examples include polycarbonate diols prepared by reacting a carbonate component such as alkylene carbonates, diaryl carbonates, and dialkyl carbonates or phosgene with an aliphatic diol component.

Examples of the polyol having a hydrophilic group as the specific example of the short-chain polyol include polyols having an acid group such as a carboxy group, a sulfonic acid group, and a phosphonic acid group; and polyols having a hydrophilic group such as a carbonyl group and a hydroxy group in the structure thereof. It is particularly preferred to use a water-soluble urethane resin synthesized by further using a polyol having an acid group, such as dimethylolpropionic acid and dimethylolbutanoic acid in addition to the long-chain polyol. The acid group may be a salt form. Examples of the cation constituting the salt include a lithium ion, a sodium ion, a potassium ion, an ammonium ion, and organic ammonium ions.

The chain extender is a compound capable of reacting with a remaining isocyanate group that fails to form a urethane bond among the polyisocyanate units in the urethane prepolymer prepared by reacting a polyisocyanate and a polyol. As the chain extender, polyvalent amines such as dimethylol ethylamine, ethylenediamine, and diethylenetriamine; polyvalent imines such as polyethylene polyimine; and polyhydric alcohols such as neopentyl glycol and butylethylpropanediol are usable. Specifically, the polyhydric alcohol is preferably used as the chain extender. When the water-soluble urethane resin synthesized by using the polyhydric alcohol as the chain extender is used, the gloss clarity of images can be effectively improved. Among the polyhydric alcohols, neopentyl glycol is particularly preferred.

The water-soluble urethane resin synthesized by using the polyvalent amine or the polyvalent imine as the chain extender has a cationic moiety in the structure thereof and thus is likely to aggregate. This is likely to deteriorate the smoothness of images recorded and slightly deteriorates the improvement effect of the gloss clarity of images in some cases. In contrast, the water-soluble urethane resin synthesized by using the polyhydric alcohol such as neopentyl glycol as the chain extender has no cationic moiety in the structure thereof and thus can particularly effectively improve the gloss clarity of images.

The water-soluble urethane resin preferably has an acid value of 45 mg KOH/g or more to 70 mg KOH/g or less. If the water-soluble urethane resin has an acid value of less than 45 mg KOH/g, the solubility in the ink becomes unstable. Accordingly, the water-soluble urethane resin interacts weakly with the polyether-modified siloxane compound, and the improvement effect of the gloss clarity is reduced in some cases. If the water-soluble urethane resin has an acid value of more than 70 mg KOH/g, the improvement effect of the gloss clarity is reduced in some cases. The reason for this is as follows: a water-soluble urethane resin having a higher acid value is dissolved in the ink too stably. Accordingly, the stable dissolution of the urethane resin in an aqueous medium is dominant over the interaction with the polyether-modified siloxane compound due to hydrogen bonds, and the diffusibility of the water-soluble urethane resin is reduced.

The water-soluble urethane resin preferably has a weight-average molecular weight of 8,000 or more to 22,000 or less. If having a weight-average molecular weight of less than 8,000, the water-soluble urethane resin is excessively small as compared with the weight-average molecular weight of the polyether-modified siloxane compound. On this account, the number of urethane bonds required to form the interaction with the polyether-modified siloxane compound is reduced, thus the interaction becomes weak, and the improvement effect of the gloss clarity is reduced in some cases. If having a weight-average molecular weight of more than 22,000, the water-soluble urethane resin interacts weakly with the polyether-modified siloxane compound due to steric hindrance or other effects, and thus the improvement effect of the gloss clarity is reduced in some cases.

(Polyether-Modified Siloxane Compound)

The second ink constituting the ink set of the present invention contains a polyether-modified siloxane compound. The first ink constituting the ink set of the present invention may contain a polyether-modified siloxane compound. The content $S_1$ (% by mass) of the polyether-modified siloxane compound in the first ink is required to be smaller than the content $S_2$ (% by mass) of the polyether-modified siloxane compound in the second ink. In the present invention, the "polyether-modified siloxane compound" is a compound having a polydimethylsiloxane skeleton in the molecular structure thereof and further having a polyether chain (for example, polyethylene oxide and polypropylene oxide).

The content $S_1$ (% by mass) of the polyether-modified siloxane compound in the first ink is preferably 0.10% by mass or less and more preferably 0.00% by mass based on the total mass of the first ink. In other words, the first ink preferably contains no polyether-modified siloxane compound. If the content $S_1$ of the polyether-modified siloxane compound in the first ink is more than 0.10% by mass, the polyether-modified siloxane compound in the second ink is difficult to move, and thus the gloss clarity of images deteriorate in some cases. By using a first ink containing no polyether-modified siloxane compound, the water-soluble urethane resin moves more efficiently, and the improvement effect of the gloss clarity is further improved.

The content (% by mass) of the polyether-modified siloxane compound in the second ink is preferably 3.00% by mass or less based on the total mass of the second ink. If the content $S_2$ of the polyether-modified siloxane compound in the second ink is more than 3.00% by mass, the second ink has higher viscosity, and appropriate performances as an ink, such as ejecting stability cannot be sufficiently achieved in some cases. The content $S_2$ (% by mass) of the polyether-modified siloxane compound in the second ink is preferably 2.00% by mass or less, more preferably 1.00% by mass or less, and particularly preferably 0.50% by mass or less. The content $S_2$ (% by mass) of the polyether-modified siloxane compound in the second ink is preferably more than 0.10% by mass, more preferably 0.12% by mass or more, and particularly preferably 0.20% by mass or more. The difference between the content $S_2$ (% by mass) of the polyether-modified siloxane compound in the second ink and the content $S_1$ (% by mass) of the polyether-modified siloxane compound in the first ink ($S_2-S_1$) is preferably 0.05% by mass or more. If the difference ($S_2-S_1$) in content of the polyether-modified siloxane compound is less than 0.05% by mass, the polyether-modified siloxane compound requiring interaction diffuses more slowly, and the effect of improving the gloss clarity of images is reduced in some cases. The difference in content of the polyether-modified siloxane compound ($S_2-S_1$) is preferably 3.00% by mass or less, more preferably 2.00% by mass or less, and particularly preferably 1.00% by mass or less.

The type of the polyether-modified siloxane compound in the first ink may be the same as or different from the type of the polyether-modified siloxane compound in the second ink. When both the first ink and the second ink contain polyether-modified siloxane compounds, the two inks preferably contain the same polyether-modified siloxane compound. When two inks contain the same polyether-modified siloxane compound, the efficiency of interaction between the water-soluble urethane resin and the polyether-modified siloxane compound becomes equivalent between the first ink and the second ink, and the diffusion speed of the polyether-modified siloxane compound is likely to be constant. Accordingly, the abrasion resistance of images can be further improved.

The polyether-modified siloxane compound is required to have a weight-average molecular weight of 10,000 or more to 50,000 or less. If the polyether-modified siloxane compound has a weight-average molecular weight of less than 10,000, the abrasion resistance cannot be improved, and the improvement effect of the gloss clarity is reduced in some cases. If the polyether-modified siloxane compound has a weight-average molecular weight of more than 50,000, the gloss clarity cannot be improved.

The weight-average molecular weight of the polyether-modified siloxane compound can be determined by gel permeation chromatography (GPC) using tetrahydrofuran as a mobile phase. The measurement method of the weight-average molecular weight of a polyether-modified siloxane compound will be described below. The measurement conditions, the filter to be used, the column, the standard polystyrene sample, the molecular weight of the standard polystyrene sample, and the like are not necessarily limited to the examples shown below.

First, a sample to be measured (polyether-modified siloxane compound) is mixed with tetrahydrofuran, then the mixture is allowed to stand for several hours, and the polyether-modified siloxane compound is dissolved to prepare a solution. The prepared solution was filtered through a solvent-resistant membrane-filter with a pore size of 0.45

μm (for example, trade name "TITAN2 Syringe Filter", PTFE, 0.45 μm, manufactured by SUN-SRi), giving a sample solution. The sample solution is appropriately adjusted to have a polyether-modified siloxane compound concentration of 0.1% by mass to 0.5% by mass. For GPC, a refractive index (RI) detector is used. In order to accurately measure a molecular weight ranging from $10^3$ to $2\times10^6$, a plurality of commercially available polystyrene gel columns are used in combination. For example, a combination of four columns of trade name "Shodex KF-806M" (manufactured by Showa Denko K. K.) or equivalent columns to the combination can be used. Through columns stabilized in a heat chamber at 40.0° C., tetrahydrofuran is passed at a flow rate of 1 mL/min, and about 0.1 mL of the above sample solution is injected. The weight-average molecular weight of a polyether-modified siloxane compound is determined by using a molecular weight calibration curve prepared by using standard polystyrene samples. As the standard polystyrene samples, polystyrenes having a molecular weight of about $10^2$ to $10^7$ (for example, manufactured by Polymer Laboratories) are used. At least 10 types of standard polystyrene samples are preferably used.

The polyether-modified siloxane compound preferably has an HLB value of 9 or more. If having an HLB value of less than 9, the polyether-modified siloxane compound has low hydrophilicity and thus is difficult to be stably present in an aqueous ink in some cases. Accordingly, such a polyether-modified siloxane compound interacts weakly with the water-soluble urethane resin and insufficiently diffuses, and the effect of improving the abrasion resistance is reduced in some cases. In the present invention, the "HLB value" is a value determined by Griffin's method. As described later, the HLB value is 20 or less.

The HLB value by Griffin's method can be calculated in accordance with the below expression from the formula weight of a hydrophilic group (ethylene oxide group) of the polyether-modified siloxane compound and the molecular weight. The HLB value calculated by Griffin's method is a physical property value indicating the degree of hydrophilicity or lipophilicity of a compound and is a value ranging from 0 to 20. A smaller HLB value indicates higher lipophilicity, and a larger HLB value indicates higher hydrophilicity.

HLB value=20×formula weight of hydrophilic group of polyether-modified siloxane compound/molecular weight of polyether-modified siloxane compound The polyether-modified siloxane compound is preferably a compound represented by any of General Formulae (1) to (3). By using the compound represented by any of General Formulae (1) to (3), images having more excellent abrasion resistance can be recorded. In General Formulae (1) to (3), ($C_2H_4O$) represents an ethylene oxide unit, and ($C_3H_6O$) represents a propylene oxide unit. In the molecular structure, the ethylene oxide units and the propylene oxide units may be present in a random manner or in a block manner. Here, units "being present in a random manner" means that ethylene oxide units and propylene oxide units are arranged irregularly. Units "being present in a block manner" means that blocks configured to include a plurality of units are arranged regularly.

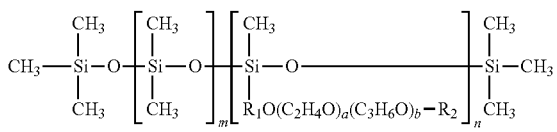

(1)

(In General Formula (1), $R_1$ is an alkylene group having 1 or more to 20 or less carbon atoms; $R_2$ is a hydrogen atom or an alkyl group having 1 or more to 20 or less carbon atoms; m is a number of 1 or more to 350 or less; n is a number of 1 or more to 100 or less; a is a number of 1 or more to 100 or less; and b is a number of 0 or more to 100 or less)

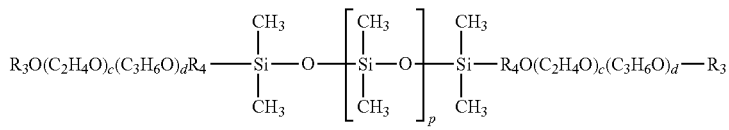

(2)

(In General Formula (2), each of $R_3$s is independently a hydrogen atom or an alkyl group having 1 or more to 20 or less carbon atoms; each of $R_4$s is independently an alkylene group having 1 or more to 20 or less carbon atoms; p is a number of 1 or more to 450 or less; c is a number of 1 or more to 270 or less; and d is a number of 0 or more to 100 or less)

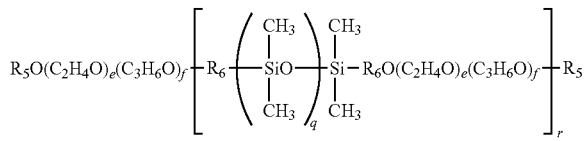

(3)

(In General Formula (3), each of $R_5$s is independently a hydrogen atom or an alkyl group having 1 or more to 20 or less carbon atoms; each of $R_6$s is independently an alkylene group having 1 or more to 20 or less carbon atoms; q is a number of 1 or more to 100 or less; r is a number of 1 or more to 100 or less; e is a number of 1 or more to 100 or less; and f is a number of 0 or more to 100 or less)

In General Formula (1), $R_1$ is preferably an alkylene group having 1 or more to 10 or less carbon atoms and more preferably an ethylene group, a propylene group, or a butylene group. $R_2$ is preferably an alkyl group having 1 or more to 10 or less carbon atoms and more preferably a methyl group, an ethyl group, or a propyl group. m is preferably a number of 1 or more to 250 or less and more preferably a number of 1 or more to 100 or less. n is preferably a number of 1 or more to 50 or less. a is preferably a number of 1 or more to 50 or less. b is preferably a number of 0 or more to 50 or less and more preferably a number of 1 or more to 50 or less.

In General Formula (2), each of $R_3$s is independently, preferably a hydrogen atom or an alkyl group having 1 or more to 10 or less carbon atoms and more preferably a hydrogen atom, an ethyl group, or a propyl group. Each of $R_4$s is independently, preferably an alkylene group having 1 or more to 10 or less carbon atoms and more preferably an ethylene group, a propylene group, or a butylene group. p is preferably a number of 1 or more to 100 or less and more preferably a number of 1 or more to 50 or less.

In General Formula (3), each of $R_5$s is independently, preferably a hydrogen atom or an alkyl group having 1 or more to 10 or less carbon atoms and more preferably a hydrogen atom, an ethyl group, or a propyl group. Each of $R_6$s is independently, preferably an alkylene group having 1 or more to 10 or less carbon atoms and more preferably an ethylene group, a propylene group, or a butylene group. e is preferably a number of 1 or more to 50 or less. f is preferably a number of 1 or more to 100 or less and more preferably a number of 1 or more to 50 or less.

The compound represented by General Formula (1) can be synthesized, for example, by addition reaction of two compounds represented by the following formulae to add an alkenyl group to a hydrogen atom of a polysiloxane. In the following formulae, m is a number of 1 or more to 350 or less; n is a number of 1 or more to 100 or less; a is a number of 1 or more to 100 or less; b is a number of 0 or more to 100 or less; and R is an alkenyl group having 1 or more to 20 or less carbon atoms.

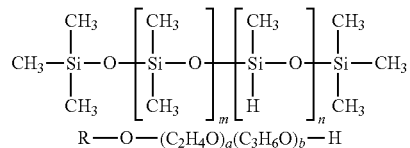

The compound represented by General Formula (2) can be synthesized, for example, by addition reaction of two compounds represented by the following formulae to add an alkenyl group to a hydrogen atom of a polysiloxane. In the following formulae, p is a number of 1 or more to 450 or less; c is a number of 1 or more to 270 or less; d is a number of 0 or more to 100 or less; and R is an alkenyl group having 1 or more to 20 or less carbon atoms.

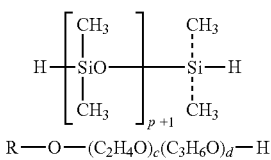

The compound represented by General Formula (3) can be synthesized, for example, by addition reaction of two compounds represented by the following formulae to add an alkenyl group to a hydrogen atom of a polysiloxane. In following formulae, q is a number of 1 or more to 100 or less; e is a number of 1 or more to 100 or less; f is a number of 0 or more to 100 or less; and R is an alkenyl group having 1 or more to 20 or less carbon atoms.

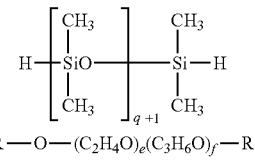

The polyether-modified siloxane compound is preferably a compound represented by General Formula (1) because images having more excellent abrasion resistance can be recorded. In the structure represented by General Formula (1), the polydimethylsiloxane moieties are present concentratedly at a single site. Accordingly, the compound represented by General Formula (1) allows the polydimethylsiloxane moieties to be more efficiently arranged on the surface of a pigment layer, and thus the abrasion resistance is supposed to be further improved.

(Aqueous Medium)

Each ink constituting the ink set of the present invention is an aqueous ink containing an aqueous medium that is a mixed solvent of water and a water-soluble organic solvent. As the water, deionized water (ion-exchanged water) is preferably used. The content (% by mass) of water in the ink is preferably 50.00% by mass or more to 95.00% by mass or less and more preferably 70.00% by mass or more to 90.00% by mass or less based on the total mass of the ink.

The water-soluble organic solvent may be any water-soluble solvent, and can be an alcohol, a polyhydric alcohol, a polyglycol, a glycol ether, a nitrogen-containing polar solvent, or a sulfur-containing polar solvent, for example. However, it is preferred that alkanediols having poor water solubility and having about 7 or more carbon atoms be not used because the ink ejection stability slightly deteriorates in some cases. In the ink, the content (% by mass) of the water-soluble organic solvent is preferably 3.00% by mass or more to 50.00% by mass or less and more preferably 15.00% by mass or more to 40.00% by mass or less based on the total mass of the ink. If the content of the water-soluble organic solvent is out of the range, a high level of ink ejecting stability cannot be sufficiently achieved in some cases.

(Water-Soluble Resin)

Each ink constituting the ink set of the present invention can further contain water-soluble resins other than the above-mentioned resin dispersant and the water-soluble urethane resin. Such a water-soluble resin is exemplified by copolymers of a hydrophobic monomer and a hydrophilic monomer. Examples of the hydrophobic monomer include styrene, methylstyrene, vinylnaphthalene, and (meth) acrylates. Examples of the hydrophilic monomer include acid monomers such as (meth)acrylic acid and maleic acid and salts thereof.

The "water-soluble resin" means a resin capable of being dissolved in an aqueous medium that is a mixed solvent of water and a water-soluble organic solvent and capable of being present in an aqueous medium in the form without any particle size. Whether the resin is water-soluble is specifically determined by the same procedure as in the above case of the water-soluble urethane resin.

(Resin Particles)

Each ink constituting the ink set of the present invention can further contain resin particles. The resin particles are exemplified by particles formed of a resin such as acrylic resins, olefinic resins, and urethane resins. Specifically, resin particles formed of an acrylic resin are preferably contained. When containing resin particles formed of an acrylic resin, the ink is not required to contain resin particles formed of a resin such as olefinic resins and urethane resins. The acrylic resin may be any resin at least having an acrylic component such as units derived from (meth)acrylic acid and units derived from (meth)acrylate esters. More specifically, the resin is preferably a resin having a hydrophilic unit and a hydrophobic unit as constitution units.

The hydrophilic unit (unit having a hydrophilic group such as acid groups and a hydroxy group) can be formed by polymerizing a monomer having a hydrophilic group, for example. Specific examples of the monomer having a hydrophilic group include monomers having a carboxy group, such as (meth)acrylic acid, itaconic acid, maleic acid, and fumaric acid; monomers having a sulfonic acid group, such as styrenesulfonic acid; monomers having a phosphonic acid group, such as ethyl (meth)acrylate-2-phosphonate; anionic monomers such as anhydrides and salts of these acidic monomers; and monomers having a hydroxy group, such as 2-hydroxyethyl (meth)acrylate and 3-hydroxypropyl (meth)acrylate. Examples of the cation constituting the salt of an anionic monomer include a lithium ion, a sodium ion, a potassium ion, an ammonium ion, and organic ammonium ions.

The hydrophobic unit (unit not having a hydrophilic group such as acid groups and a hydroxy group) can be formed by polymerizing a monomer having a hydrophobic group, for example. Specific examples of the monomer having a hydrophobic group include monomers having an aromatic ring, such as styrene, α-methylstyrene, and benzyl (meth)acrylate; and monomers having an aliphatic group, such as ethyl (meth)acrylate, methyl (meth)acrylate, (iso) propyl (meth)acrylate, (n-, iso-, t-)butyl (meth)acrylates, and 2-ethylhexyl (meth)acrylate. It is preferred that the resin particles do not have a unit having a siloxane structure because the gloss clarity of images slightly deteriorates in some cases.

In the present invention, resin particles synthesized by emulsion polymerization or soap-free polymerization are preferably used. The resin constituting the resin particles preferably have an acid value of 40 mg KOH/g or more to 200 mg KOH/g or less. The resin particles preferably have a volume-average particle size of 30 nm or more to 200 nm or less. The resin particles preferably have a minimum film-forming temperature of −50° C. or more to 25° C. or less. In each ink, the content (% by mass) of the resin particles is preferably 0.20% by mass or more to 5.00% by mass or less based on the total mass of the corresponding ink.

The volume-average particle size of resin particles means a particle size (D50) at an accumulation volume of 50% and can be determined in the following conditions. First, resin particles are diluted 50-fold (in terms of volume) with pure water to prepare a measurement sample. Then, a particle size distribution analyzer is used, and the volume-average particle size of the resin particles in the measurement sample is determined in accordance with the following measurement conditions.

[Measurement Conditions]
SetZero: 30 seconds
Number of measurements: three times
Measurement time: 180 seconds
Refractive index: 1.5

As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions, and the like are not limited to the above.

(Other Additives)

Each ink constituting the ink set of the present invention can contain water-soluble organic compounds that are solid at normal temperature, including polyhydric alcohols such as trimethylolpropane and trimethylolethane and urea and derivatives thereof as necessary in addition to the above-mentioned components. However, if a solid component such as wax particles including polyolefin particles and water-insoluble organic compounds including sulfonamide compounds and ester compounds is present, the gloss clarity of images slightly deteriorate in some cases, and thus the ink preferably does not contain such a solid component. Each ink constituting the ink set of the present invention can also contain surfactants, pH adjusters, anticorrosives, antiseptic agents, antifungal agents, antioxidants, reduction inhibitors, evaporation accelerators, chelating agents, and similar additives as necessary. Examples of the surfactant include hydrocarbon surfactants such as polyoxyethylene alkyl ether and ethylene oxide adducts of acetylene glycol; and fluorinated surfactants such as perfluoroalkyl ethylene oxide adducts.

(Physical Properties of Ink)

Each ink preferably has a surface tension at 25° C. of 10 mN/m or more to 60 mN/m or less, more preferably 20 mN/m or more to 60 mN/m or less, and particularly preferably 20 mN/m or more to 40 mN/m or less. The difference in surface tension between the first ink and the second ink is preferably within 2 mN/m. If the surface tension difference is more than 2 mN/m, dots are likely to be mixed, and bleeding is likely to be caused in some cases. The surface tension of an ink can be adjusted by appropriately controlling the type or the content of a surfactant or a water-soluble organic solvent. Each ink constituting the ink set of the present invention is preferably adjusted to have an intended viscosity or pH so as to achieve good ejecting performance when ejected from a nozzle of an ink jet recording head.

<Ink Jet Recording Method>

An ink jet recording method of the present invention is a method of ejecting each ink contained in the above-described ink set of the present invention from an ink jet recording head to record an image on a recording medium. The system for ejecting the ink is exemplified by a system of applying mechanical energy to the ink and a system of applying thermal energy to the ink. In the present invention, a system of applying thermal energy to an ink to eject the ink is particularly preferably adopted. The ink jet recording method includes known steps except that the inks of the present invention are used.

Figure 1B:
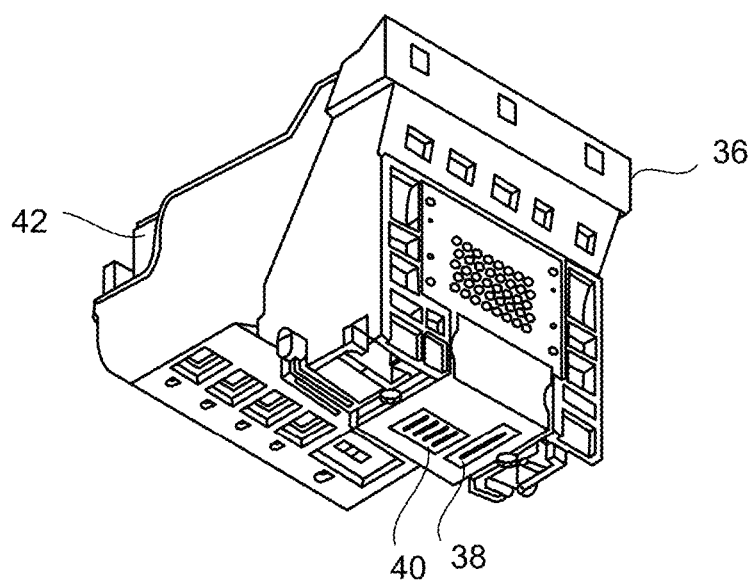

FIGS. 1A and 1B are schematic views illustrating an exemplary ink jet recording apparatus used for an ink jet recording method of the present invention; FIG. 1A is a perspective view of a principal part of the ink jet recording apparatus; and FIG. 1B is a perspective view of a head cartridge. In the ink jet recording apparatus, a conveyance unit (not illustrated) for conveying a recording medium 32 and a carriage shaft 34 are provided. A head cartridge 36 can be installed on the carriage shaft 34. The head cartridge 36 is provided with a recording head 38 and 40 and is so constructed that an ink cartridge 42 is set. Inks (not illustrated) are ejected toward the recording medium 32 from the recording head 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

The recording medium to be recorded by using the ink set of the present invention may be any recording medium but is preferably a paper having permeability, such as plain paper and recording media having a coating layer (glossy paper and art paper, for example). It is particularly preferred to use the recording medium having a coating layer that allows at least some of pigment particles in the ink to be present on the surface of the recording medium or in the vicinity thereof. Such a recording medium can be selected depending on an intended purpose of the record on which an image is recorded. Example of the recording medium include glossy papers that are suitable for giving images having glossiness of photographic image quality and art papers that take advantage of substrate textures (for example, a drawing paper-like texture, a canvas-like texture, and a Japanese paper-like texture) in order to express preferred images such as pictures, photographs, and graphic images. Specifically, what is called a glossy paper having a glossy surface of a coating layer is particularly preferably used.

[Examples]

The present invention will next be described in further detail with reference to examples and comparative examples, but the invention is not intended to be limited to the following examples without departing from the scope of the invention. The component amounts with "part" or "%" are based on mass unless otherwise noted.

<Preparation of Pigment Dispersion Liquid>

Each resin dispersant used for preparing the following pigment dispersion liquids 1 to 3 was neutralized with sodium hydroxide in an amount equivalent to the acid value to prepare a sample having a resin content (solid content) of 1.0%. The particle size of the resin in the obtained sample was determined by dynamic light scattering with a particle size analyzer (trade name "UPA-EX150", manufactured by NIKKISO CO., LTD.) in conditions of a SetZero of 30 seconds, a number of measurements of three times, and a measurement time of 180 seconds. As a result, no particle size was determined, and this revealed that the resin was water-soluble.

(Pigment Dispersion Liquid 1)

A mixture of 10.0 parts of pigment, 25.0 parts of aqueous resin dispersant solution, and 65.0 parts of water was placed in a bead mill containing 0.3-mmϕ zirconia beads at a filling rate of 80% and was dispersed at a rotation speed of 1,800 rpm for 5 hours. As the bead mill, trade name "LMZ2", manufactured by Ashizawa Finetech Ltd. was used. As the pigment, C.I. Pigment Blue 15:3 was used. As the aqueous resin dispersant solution, an aqueous solution having a resin content (solid content) of 20.0% and prepared by neutralizing an acrylic resin having an acid value of 215 mg KOH/g and a weight-average molecular weight of 8,500 with potassium hydroxide in such an amount so as to be 0.95 equivalent of the acid value was used. The acrylic resin was trade name "Joncryl 678" manufactured by BASF. After the dispersion, non-dispersed components including coarse particles were removed by centrifugation. The resulting mixture was subjected to pressure filtration through a cellulose acetate filter with a pore size of 3.0 μm (manufactured by ADVANTEC), giving pigment dispersion liquid 1 having a pigment content of 10.0% and a resin dispersant content (solid content) of 5.0%.

(Pigment Dispersion Liquid 2)

Pigment dispersion liquid 2 having a pigment content of 10.0% and a resin dispersant content (solid content) of 5.0% was prepared in the same manner as for the pigment dispersion liquid 1 except that the pigment type was changed to a solid solution pigment (a solid solution pigment of C.I. Pigment Violet 19 and C.I. Pigment Red 202, trade name "CROMOPHTAL Jet 2BC", manufactured by Ciba Specialty Chemicals).

(Pigment Dispersion Liquid 3)

Pigment dispersion liquid 3 having a pigment content of 10.0% and a resin dispersant content (solid content) of 5.0% was prepared in the same manner as for the pigment dispersion liquid 1 except that the pigment type was changed to carbon black (trade name "Black Pearls 880", manufactured by Cabot).

<Synthesis of Water-Soluble Urethane Resin>

In a four-necked flask equipped with a thermometer, a stirrer, a nitrogen inlet tube, and a condenser, a polyol in an amount shown in Table 1, 44.5 g of isophorone diisocyanate, and 0.007 g of dibutyltin dilaurate were placed. In Table 1, the numerical values with the polyols represent number average molecular weights. PPG represents polypropylene glycol; PTMG represents polytetramethylene glycol; PEG represents polyethylene glycol; and PBCD represents polybutylene carbonate diol. Under a nitrogen gas atmosphere, the mixture was reacted at a temperature of 100° C. for 5 hours and then cooled to a temperature of 65° C. or less. Dimethylolpropionic acid in an amount shown in Table 1, 3.0 g of neopentyl glycol, and 150.0 g of methyl ethyl ketone were added, and the resulting mixture was reacted at a temperature of 80° C. Then, the reaction mixture was cooled to a temperature of 40° C., and 20.0 g of methanol was added to stop the reaction. Next, an appropriate amount of ion-exchanged water was added, and an aqueous potassium hydroxide solution required for neutralizing the resin was added while the mixture was stirred with a homomixer. Then, the methyl ethyl ketone and the unreacted methanol were distilled off under heat and reduced pressure, giving aqueous solutions of water-soluble urethane resins each having a resin content (solid content) of 10.0%. The weight-average molecular weight was adjusted by appropriately changing the reaction time at a temperature of 80° C. The acid value and the weight-average molecular weight in terms of polystyrene of each resin are shown in Table 1.

The aqueous water-soluble urethane resin solution obtained above was diluted with pure water to prepare a sample having a resin content (solid content) of 1.0%. The particle size of the resin in the obtained sample was determined by dynamic light scattering with a particle size analyzer (trade name "UPA-EX150", manufactured by NIKKISO CO., LTD.) in conditions of a SetZero of 30 seconds, a number of measurements of three times, and a measurement time of 180 seconds. As a result, no particle size was determined in each resin, and this revealed that each resin was water-soluble.

TABLE 1

Synthetic conditions and characteristics of urethane resins

| Urethane resin number | Polyol Type | Amount (g) | Amount (g) of dimethylolpropionic acid | Acid value (mgKOH/g) | Weight-average molecular weight |
|---|---|---|---|---|---|
| 1 | PPG1000 | 39.3 | 13.2 | 55 | 15,000 |
| 2 | PPG1000 | 39.3 | 13.2 | 55 | 8,000 |
| 3 | PPG1000 | 39.3 | 13.2 | 55 | 20,000 |
| 4 | PPG1000 | 39.3 | 13.2 | 55 | 22,000 |
| 5 | PPG1000 | 41.7 | 10.8 | 45 | 20,000 |

TABLE 1-continued

Synthetic conditions and characteristics of urethane resins

| Urethane resin number | Polyol Type | Polyol Amount (g) | Amount (g) of dimethylol-propionic acid | Resin characteristics Acid value (mgKOH/g) | Resin characteristics Weight-average molecular weight |
|---|---|---|---|---|---|
| 6 | PPG1000 | 35.7 | 16.8 | 70 | 20,000 |
| 7 | PPG1000 | 39.3 | 13.2 | 55 | 7,500 |
| 8 | PPG1000 | 42.2 | 10.3 | 43 | 20,000 |
| 9 | PPG1000 | 39.3 | 13.2 | 75 | 20,000 |
| 10 | PPG1000 | 39.3 | 13.2 | 55 | 22,500 |
| 11 | PTMG2000 | 39.3 | 13.2 | 55 | 15,000 |
| 12 | PEG1000 | 39.3 | 13.2 | 55 | 15,000 |
| 13 | PBCD2000 | 39.3 | 13.2 | 55 | 15,000 |

<Synthesis of Polyether-Modified Siloxane Compound>
(Compound Represented by General Formula (1))

In a glass container equipped with a thermometer and a stirrer, a polysiloxane compound represented by Formula (A) and a polyoxyalkylene compound represented by Formula (B) were placed. The compounds were subjected to addition reaction in the presence of a platinum catalyst, and a compound (polyether-modified siloxane compound) represented by General Formula (1) was synthesized. The characteristics of the synthesized compounds are shown in Table 2. Here, m, n, $R_1$, $R_2$, a, and b in Formulae (A) and (B) correspond to m, n, $R_1$, $R_2$, a, and b in General Formula (1) representing the structure of each compound synthesized, respectively. Table 2 also shows the weight-average molecular weights and the HLB values of commercially available compounds (trade name "BYK347", "BYK348" (manufactured by BYK-Chemie)) having structures represented by General Formula (1).

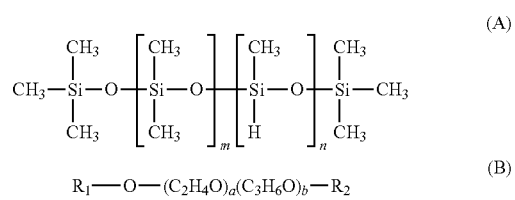

(A)

(B)

TABLE 2

Characteristics of compounds represented by Formula (1)

| Compound | m | n | $R_1$ | $R_2$ | a | b | Weight-average molecular weight | HLB (theoretical value) |
|---|---|---|---|---|---|---|---|---|
| 1 | 140 | 10 | Propylene group | H | 20 | 0 | 20500 | 9 |
| 2 | 110 | 5 | Propylene group | H | 30 | 10 | 18400 | 10 |
| 3 | 160 | 4 | Propylene group | H | 35 | 35 | 26800 | 11 |
| 4 | 5 | 6 | Propylene group | H | 35 | 0 | 10500 | 18 |
| 5 | 51 | 12 | Propylene group | H | 9 | 0 | 10100 | 9 |
| 6 | 75 | 10 | Propylene group | H | 10 | 0 | 11300 | 8 |
| 7 | 315 | 25 | Propylene group | H | 20 | 0 | 48500 | 9 |

TABLE 2-continued

Characteristics of compounds represented by Formula (1)

| Compound | m | n | $R_1$ | $R_2$ | a | b | Weight-average molecular weight | HLB (theoretical value) |
|---|---|---|---|---|---|---|---|---|
| 8 | 50 | 11 | Propylene group | H | 9 | 0 | 9500 | 9 |
| 9 | 325 | 25 | Propylene group | H | 21 | 0 | 50300 | 9 |
| BYK347 | — | — | — | — | — | — | 1500 | — |
| BYK348 | — | — | — | — | — | — | 2800 | — |

(Compound Represented by General Formula (2))

In a glass container equipped with a thermometer and a stirrer, a polysiloxane compound represented by Formula (C) and a polyoxyalkylene compound represented by Formula (D) were placed. The compounds were subjected to addition reaction in the presence of a platinum catalyst, and a compound (polyether-modified siloxane compound) represented by General Formula (2) was synthesized. The characteristics of the synthesized compounds are shown in Table 3. Here, p, $R_3$, $R_4$, c, and d in Formulae (C) and (D) correspond to p, $R_3$, $R_4$, c, and d in General Formula (2) representing the structure of each compound synthesized, respectively. Table 3 also shows the weight-average molecular weight and the HLB value of a commercially available compound (trade name "BYK333" (manufactured by BYK-Chemie)) having a structure represented by General Formula (2).

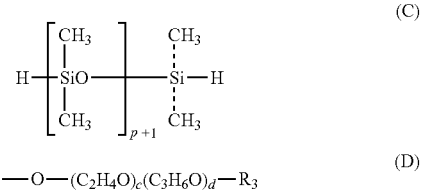

(C)

(D)

TABLE 3

Characteristics of compounds represented by Formula (2)

| Compound | p | $R_3$ | $R_4$ | c | d | Weight-average molecular weight | HLB (theoretical value) |
|---|---|---|---|---|---|---|---|
| 10 | 70 | H | Propylene group | 55 | 0 | 10300 | 9 |
| 11 | 350 | H | Propylene group | 240 | 0 | 47300 | 9 |
| 12 | 85 | H | Propylene group | 50 | 0 | 11000 | 8 |
| 13 | 115 | H | Propylene group | 155 | 0 | 22400 | 12 |
| 14 | 70 | H | Propylene group | 50 | 0 | 9800 | 9 |
| 15 | 370 | H | Propylene group | 265 | 0 | 51000 | 9 |
| BYK333 | — | — | — | — | — | 8000 | 10 |

(Compound Represented by General Formula (3))

In a glass container equipped with a thermometer and a stirrer, a polysiloxane compound represented by Formula (E) and a polyoxyalkylene compound represented by Formula (F) were placed. The compounds were subjected to addition reaction in the presence of a platinum catalyst, and a compound (polyether-modified siloxane compound) represented by General Formula (3) was synthesized. The characteristics of the synthesized compounds are shown in Table 4. Here, q, $R_5$, $R_6$, e, and f in Formulae (E) and (F) correspond to q, $R_5$, $R_6$, e, and f in General Formula (3) representing the structure of each compound synthesized, respectively.

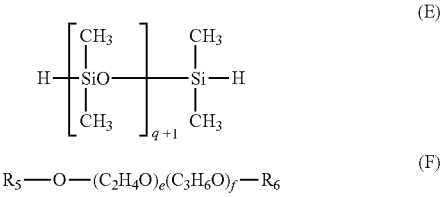

$$R_5—O—(C_2H_4O)_e(C_3H_6O)_f—R_6 \quad (F)$$

TABLE 4

Characteristics of compounds represented by Formula (3)

| Compound | q | $R_5$ | $R_6$ | e | f | r | Weight-average molecular weight | HLB (theoretical value) |
|---|---|---|---|---|---|---|---|---|
| 16 | 7 | Propylene group | Propylene group | 12 | 0 | 8 | 10100 | 9 |
| 17 | 5 | Propylene group | Propylene group | 10 | 0 | 50 | 48200 | 9 |
| 18 | 8 | Propylene group | Propylene group | 10 | 0 | 9 | 11100 | 8 |
| 19 | 7 | Propylene group | Propylene group | 11 | 0 | 8 | 9700 | 9 |
| 20 | 5 | Propylene group | Propylene group | 9 | 0 | 55 | 50500 | 9 |

<Preparation of Ink>

Components (unit: %) shown in upper rows in Tables 5 and 6 were mixed and thoroughly stirred, and the resulting mixture was subjected to pressure filtration through a cellulose acetate filter with a pore size of 0.8 μm (manufactured by ADVANTEC), giving each ink. Lower rows in Tables 5 and 6 show characteristics of the inks (the content of a polyether-modified siloxane compound is expressed as "content of Si compound"). The details of "aqueous dispersion of urethane resin particles", "fluorinated surfactant", "aqueous solution of acrylic resin", and "Acetylenol E 100" in Tables 5 and 6 are shown below.

Aqueous dispersion of urethane resin particles: an aqueous dispersion containing self-crosslinked urethane resin particles having a volume-average particle size of 90 nm (a resin content [solid content] of 30.0%); the aqueous dispersion of urethane resin particles is trade name "Takelac WS-6021" manufactured by Mitsui Chemicals, Inc.

Fluorinated surfactant: a fluorinated surfactant manufactured by DuPont, trade name "Zonyl FS-3100"

Aqueous solution of acrylic resin: an aqueous solution having a resin content (solid content) of 10.0% and prepared by dissolving an acrylic resin having an acid value of 160 mg KOH/g and a weight-average molecular weight of 8,000 in potassium hydroxide in an amount equivalent to the acid value and an appropriate amount of ion-exchanged water. The acrylic resin is trade name "Joncryl 683" manufactured by BASF. Whether the acrylic resin was water-soluble was determined by the same procedure as in the above case of the water-soluble urethane resin. As a result, no particle size was determined, and this revealed that the resin was water-soluble.

Acetylenol E 100: the trade name of a surfactant (ethylene oxide adduct of acetylene glycol) manufactured by Kawaken Fine Chemicals

TABLE 5

Constitutions and characteristics of first inks

| | I-1 | I-2 | I-3 | I-4 | I-5 | I-6 | I-7 | I-8 | I-9 | I-10 | I-11 | I-12 | I-13 | I-14 |
|---|---|---|---|---|---|---|---|---|---|---|---|---|---|---|
| Pigment dispersion liquid 1 | 30.00 | 30.00 | 30.00 | 30.00 | 30.00 | 30.00 | 30.00 | | 30.00 | 30.00 | 30.00 | 30.00 | 30.00 | 30.00 |
| Pigment dispersion liquid 3 | | | | | | | | 30.00 | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 |
| Triethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 |
| Triethanolamine | | | | | | | | | | | | | | |
| Aqueous solution of urethane resin 1 | 4.00 | | | | | | | | 4.00 | 4.00 | 4.00 | | | |
| Aqueous solution of urethane resin 2 | | 4.00 | | | | | | | | | | | | |
| Aqueous solution of urethane resin 3 | | | 4.00 | | | | | | | | | | | |
| Aqueous solution of urethane resin 4 | | | | 4.00 | | | | | | | | | | |
| Aqueous solution of urethane resin 5 | | | | | 4.00 | | | | | | | | | |
| Aqueous solution of urethane resin 6 | | | | | | 4.00 | | | | | | | | |
| Aqueous solution of urethane resin 7 | | | | | | | | | | | | | 4.00 | |
| Aqueous solution of urethane resin 8 | | | | | | | | | | | | | | |
| Aqueous solution of urethane resin 9 | | | | | | | | | | | | | | |
| Aqueous solution of urethane resin 10 | | | | | | | | | | | | | | 4.00 |
| Aqueous solution of urethane resin 11 | | | | | | | 4.00 | | | | | | | |
| Aqueous solution of urethane resin 12 | | | | | | | | | | | | 4.00 | | |
| Aqueous solution of urethane resin 13 | | | | | | | | | | | 4.00 | | | |
| Aqueous dispersion of urethane resin particles | | | | | | | | | | | | | | |
| Compound 1 | | | | | | | | | 0.10 | 0.15 | | | | |
| BYK 348 | | | | | | | | | | | | | | |
| Compound 12 | | | | | | | | | | | | | | |
| Fluorinated surfactant | | | | | | | | | | | | | | |
| Aqueous solution of acrylic resin | 8.00 | 8.00 | 8.00 | 8.00 | 8.00 | 8.00 | 8.00 | 8.00 | 8.00 | 8.00 | 8.00 | 8.00 | 8.00 | 8.00 |
| Acetylenol E 100 | 1.00 | 1.00 | 1.00 | 1.00 | 1.00 | 1.00 | 1.00 | 1.00 | 1.00 | 1.00 | 1.00 | 1.00 | 1.00 | 1.00 |
| Pure water | 37.00 | 37.00 | 37.00 | 37.00 | 37.00 | 37.00 | 37.00 | 37.00 | 36.90 | 36.85 | 37.00 | 37.00 | 37.00 | 37.00 |
| Content $P_1$(%) of pigment | 3.00 | 3.00 | 3.00 | 3.00 | 3.00 | 3.00 | 3.00 | 3.00 | 3.00 | 3.00 | 3.00 | 3.00 | 3.00 | 3.00 |

TABLE 5-continued

Constitutions and characteristics of first inks

| | | | | | | | | | | | | | | |
|---|---|---|---|---|---|---|---|---|---|---|---|---|---|---|
| Content $U_1$(%) of urethane resin | 0.40 | 0.40 | 0.40 | 0.40 | 0.40 | 0.40 | 0.40 | 0.40 | 0.40 | 0.40 | 0.40 | 0.40 | 0.40 | 0.40 |
| Content $S_1$(%) of Si compound | 0.00 | 0.00 | 0.00 | 0.00 | 0.00 | 0.00 | 0.00 | 0.00 | 0.10 | 0.15 | 0.00 | 0.00 | 0.00 | 0.00 |

| | I-15 | I-16 | I-17 | I-18 | I-19 | I-20 | I-21 | I-22 | I-23 | I-24 | I-25 | I-26 | I-27 | I-28 |
|---|---|---|---|---|---|---|---|---|---|---|---|---|---|---|
| Pigment dispersion liquid 1 | 30.00 | 30.00 | 30.00 | 30.00 | 30.00 | 30.00 | 30.00 | 30.00 | 30.00 | 30.00 | 30.00 | 30.00 | 80.00 | 30.00 |
| Pigment dispersion liquid 3 | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 |
| Triethylene glycol | 5.00 | 5.00 | 5.00 | 5.00 | 5.00 | 5.00 | 5.00 | 5.00 | 5.00 | 5.00 | 5.00 | 5.00 | | 5.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 |
| Triethanolamine | | | | | | | | | | | | | 0.30 | |
| Aqueous solution of urethane resin 1 | | | 2.00 | 1.50 | 4.00 | 4.00 | 4.00 | 4.00 | 1.00 | 1.00 | 1.00 | | | 4.00 |
| Aqueous solution of urethane resin 2 | | | | | | | | | | | | | | |
| Aqueous solution of urethane resin 3 | | | | | | | | | | | | | | |
| Aqueous solution of urethane resin 4 | | | | | | | | | | | | | | |
| Aqueous solution of urethane resin 5 | | | | | | | | | | | | | | |
| Aqueous solution of urethane resin 6 | | | | | | | | | | | | | | |
| Aqueous solution of urethane resin 7 | | | | | | | | | | | | | | |
| Aqueous solution of urethane resin 8 | 4.00 | | | | | | | | | | | | | |
| Aqueous solution of urethane resin 9 | | 4.00 | | | | | | | | | | | | |
| Aqueous solution of urethane resin 10 | | | | | | | | | | | | | | |
| Aqueous solution of urethane resin 11 | | | | | | | | | | | | | | |
| Aqueous solution of urethane resin 12 | | | | | | | | | | | | | | |
| Aqueous solution of urethane resin 13 | | | | | | | | | | | | | | |
| Aqueous dispersion of urethane resin particles | | | | | | | | | | | | | 3.30 | |
| Compound 1 | | | | | 0.20 | 0.21 | | 0.25 | | 0.25 | 0.25 | | | 0.25 |
| BYK 348 | | | | | | | | | | | | | 0.10 | |
| Compound 12 | | | | | | | 0.15 | | | | | | | |
| Fluorinated surfactant | | | | | | | | | | | | | | 1.00 |
| Aqueous solution of acrylic resin | 8.00 | 8.00 | 8.00 | 8.00 | 8.00 | 8.00 | 8.00 | 8.00 | 8.00 | 8.00 | 8.00 | 8.00 | | 8.00 |
| Acetylenol E 100 | 1.00 | 1.00 | 1.00 | 1.00 | 1.00 | 1.00 | 1.00 | 1.00 | 1.00 | 1.00 | 1.00 | 1.00 | | 1.00 |
| Pure water | 37.00 | 37.00 | 39.00 | 39.50 | 36.80 | 36.79 | 36.85 | 36.75 | 40.00 | 39.75 | 39.75 | 41.00 | 1.30 | 35.75 |
| Content $P_1$(%) of pigment | 3.00 | 3.00 | 3.00 | 3.00 | 3.00 | 3.00 | 3.00 | 3.00 | 3.00 | 3.00 | 3.00 | 3.00 | 8.00 | 3.00 |
| Content $U_1$(%) of urethane resin | 0.40 | 0.40 | 0.20 | 0.15 | 0.40 | 0.40 | 0.40 | 0.40 | 0.10 | 0.10 | 0.10 | 0.00 | 0.00 | 0.40 |
| Content $S_1$(%) of Si compound | 0.00 | 0.00 | 0.00 | 0.00 | 0.20 | 0.21 | 0.15 | 0.25 | 0.00 | 0.25 | 0.25 | 0.00 | 0.10 | 0.25 |

TABLE 6

Constitutions and characteristics of second inks

| | II-1 | II-2 | II-3 | II-4 | II-5 | II-6 | II-7 | II-8 | II-9 | II-10 | II-11 | II-12 | II-13 | II-14 | II-15 |
|---|---|---|---|---|---|---|---|---|---|---|---|---|---|---|---|
| Pigment dispersion liquid 1 | 10.00 | 10.00 | 10.00 | 10.00 | 10.00 | 10.00 | 10.00 | 10.00 | 10.00 | 10.00 | 10.00 | 10.00 | | 10.00 | 10.00 |
| Pigment dispersion liquid 2 | | | | | | | | | | | | | 10.00 | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Triethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Triethanolamine | | | | | | | | | | | | | | | |
| Aqueous solution of urethane resin 1 | 1.00 | | | | | | | 1.00 | 1.00 | 1.00 | 1.00 | 1.00 | 1.00 | 1.00 | 1.00 |
| Aqueous solution of urethane resin 2 | | 1.00 | | | | | | | | | | | | | |
| Aqueous solution of urethane resin 3 | | | 1.00 | | | | | | | | | | | | |
| Aqueous solution of urethane resin 4 | | | | 1.00 | | | | | | | | | | | |
| Aqueous solution of urethane resin 5 | | | | | 1.00 | | | | | | | | | | |
| Aqueous solution of urethane resin 6 | | | | | | 1.00 | | | | | | | | | |
| Aqueous solution of urethane resin 7 | | | | | | | | | | | | | | | |
| Aqueous solution of urethane resin 8 | | | | | | | | | | | | | | | |
| Aqueous solution of urethane resin 9 | | | | | | | | | | | | | | | |
| Aqueous solution of urethane resin 10 | | | | | | | | | | | | | | | |
| Aqueous solution of urethane resin 11 | | | | | | | 1.00 | | | | | | | | |
| Aqueous solution of urethane resin 12 | | | | | | | | | | | | | | | |
| Aqueous solution of urethane resin 13 | | | | | | | | | | | | | | | |
| Aqueous dispersion of urethane resin particles | | | | | | | | | | | | | | | |
| Compound 1 | 0.25 | 0.25 | 0.25 | 0.25 | 0.25 | 0.25 | 0.25 | | | | | | 0.25 | | |
| Compound 2 | | | | | | | | 0.25 | | | | | | | |
| Compound 3 | | | | | | | | | 0.25 | | | | | | |
| Compound 4 | | | | | | | | | | 0.25 | | | | | |
| Compound 5 | | | | | | | | | | | 0.25 | | | | |
| Compound 6 | | | | | | | | | | | | | | | 0.25 |
| Compound 7 | | | | | | | | | | | | 0.25 | | | |
| Compound 8 | | | | | | | | | | | | | | | |
| Compound 9 | | | | | | | | | | | | | | | |
| BYK 347 | | | | | | | | | | | | | | | |
| BYK 348 | | | | | | | | | | | | | | | |

TABLE 6-continued

Constitutions and characteristics of second inks

| | | | | | | | | | | | | | | | |
|---|---|---|---|---|---|---|---|---|---|---|---|---|---|---|---|
| Compound 10 | | | | | | | | | | | | | | | |
| Compound 11 | | | | | | | | | | | | | | | |
| Compound 12 | | | | | | | | | | | | | | | | 0.25 |
| Compound 13 | | | | | | | | | | | | | | | |
| Compound 14 | | | | | | | | | | | | | | | |
| Compound 15 | | | | | | | | | | | | | | | |
| BYK 333 | | | | | | | | | | | | | | | |
| Compound 16 | | | | | | | | | | | | | | | |
| Compound 17 | | | | | | | | | | | | | | | |
| Compound 18 | | | | | | | | | | | | | | | |
| Compound 19 | | | | | | | | | | | | | | | |
| Compound 20 | | | | | | | | | | | | | | | |
| Fluorinated surfactant | | | | | | | | | | | | | | | |
| Aqueous solution of acrylic resin | 8.00 | 8.00 | 8.00 | 8.00 | 8.00 | 8.00 | 8.00 | 8.00 | 8.00 | 8.00 | 8.00 | 8.00 | 8.00 | 8.00 | 8.00 |
| Acetylenol E 100 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| Pure water | 59.75 | 59.75 | 59.75 | 59.75 | 59.75 | 59.75 | 59.75 | 59.75 | 59.75 | 59.75 | 59.75 | 59.75 | 59.75 | 59.75 | 59.75 |
| Content $P_2$ (%) of pigment | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| Content $U_2$ (%) of urethane resin | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 |
| Content $S_2$ (%) of Si compound | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |

| | II-16 | II-17 | II-18 | II-19 | II-20 | II-21 | II-22 | II-23 | II-24 | II-25 | II-26 | II-27 | II-28 | II-29 | II-30 |
|---|---|---|---|---|---|---|---|---|---|---|---|---|---|---|---|
| Pigment dispersion liquid 1 | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Pigment dispersion liquid 2 | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Triethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Triethanolamine | | | | | | | | | | | | | | | |
| Aqueous solution of urethane resin 1 | 1.00 | 1.00 | 1.00 | 1.00 | 1.00 | 1.00 | | | | | | | | 1.00 | 1.00 |
| Aqueous solution of urethane resin 2 | | | | | | | | | | | | | | | |
| Aqueous solution of urethane resin 3 | | | | | | | | | | | | | | | |
| Aqueous solution of urethane resin 4 | | | | | | | | | | | | | | | |
| Aqueous solution of urethane resin 5 | | | | | | | | | | | | | | | |
| Aqueous solution of urethane resin 6 | | | | | | | | | | | | | | | |
| Aqueous solution of urethane resin 7 | | | | | | | | | | 1.00 | | | | | |
| Aqueous solution of urethane resin 8 | | | | | | | | | | | 1.00 | | | | |
| Aqueous solution of urethane resin 9 | | | | | | | | | | | | 1.00 | | | |
| Aqueous solution of urethane resin 10 | | | | | | | | | | | | | 1.00 | | |
| Aqueous solution of urethane resin 11 | | | | | | | | | | | | | | | |
| Aqueous solution of urethane resin 12 | | | | | | | 1.00 | | | | | | | | |
| Aqueous solution of urethane resin 13 | | | | | | | | 1.00 | | | | | | | |
| Aqueous dispersion of urethane resin particles | | | | | | | | | | | | | | | |
| Compound 1 | | | | | | | | | 0.25 | 0.25 | 0.25 | 0.25 | 0.25 | 0.25 | 0.10 |
| Compound 2 | | | | | | | | | | | | | | | |
| Compound 3 | | | | | | | | | | | | | | | |
| Compound 4 | | | | | | | | | | | | | | | |
| Compound 5 | | | | | | | | | | | | | | | |
| Compound 6 | | | | | | | | | | | | | | | |
| Compound 7 | | | | | | | | | | | | | | | |
| Compound 8 | | | | | | | | | | | | | | | |
| Compound 9 | | | | | | | | | | | | | | | |
| BYK 347 | | | | | | | | | | | | | | | |
| BYK 348 | | | | | | | | | | | | | | | |
| Compound 10 | | 0.25 | | | | | | | | | | | | | |
| Compound 11 | | | 0.25 | | | | | | | | | | | | |
| Compound 12 | | | | | | | | | | | | | | | |
| Compound 13 | | | | 0.25 | | | | | | | | | | | |
| Compound 14 | | | | | | | | | | | | | | | |
| Compound 15 | | | | | | | | | | | | | | | |
| BYK 333 | | | | | | | | | | | | | | | |
| Compound 16 | | | | | 0.25 | | | | | | | | | | |
| Compound 17 | | | | | | 0.25 | | | | | | | | | |
| Compound 18 | 0.25 | | | | | | | | | | | | | | |
| Compound 19 | | | | | | | | | | | | | | | |
| Compound 20 | | | | | | | | | | | | | | | |
| Fluorinated surfactant | | | | | | | | | | | | | | | |
| Aqueous solution of acrylic resin | 8.00 | 8.00 | 8.00 | 8.00 | 8.00 | 8.00 | 8.00 | 8.00 | 8.00 | 8.00 | 8.00 | 8.00 | 8.00 | 8.00 | 8.00 |
| Acetylenol E 100 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| Pure water | 59.75 | 59.75 | 59.75 | 59.75 | 59.75 | 59.75 | 59.75 | 59.75 | 59.75 | 59.75 | 59.75 | 59.75 | 59.75 | 60.00 | 59.90 |
| Content $P_2$ (%) of pigment | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| Content $U_2$ (%) of urethane resin | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 |
| Content $S_2$ (%) of Si compound | 0.25 | 0.25 | 0.25 | 0.25 | 0.25 | 0.25 | 0.25 | 0.25 | 0.25 | 0.25 | 0.25 | 0.25 | 0.25 | 0.00 | 0.10 |

| | II-31 | II-32 | II-33 | II-34 | II-35 | II-36 | II-37 | II-38 | II-39 | II-40 | II-41 | II-42 | II-43 | II-44 | II-45 | II-46 |
|---|---|---|---|---|---|---|---|---|---|---|---|---|---|---|---|---|
| Pigment dispersion liquid 1 | 10.00 | 10.00 | 10.00 | 10.00 | 10.00 | 10.00 | 10.00 | 10.00 | 10.00 | 10.00 | 10.00 | 10.00 | 10.00 | 10.00 | 30.00 | 10.00 |
| Pigment dispersion liquid 2 | | | | | | | | | | | | | | | | |

TABLE 6-continued

Constitutions and characteristics of second inks

| | | | | | | | | | | | | | | | | |
|---|---|---|---|---|---|---|---|---|---|---|---|---|---|---|---|---|
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 15.00 | 10.00 |
| Triethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 | | 5.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Triethanolamine | | | | | | | | | | | | | | | 0.30 | |
| Aqueous solution of urethane resin 1 | 4.00 | 4.00 | 4.00 | | | 1.00 | 1.00 | 1.00 | 1.00 | 1.00 | 1.00 | 1.00 | 1.00 | 1.00 | | 1.00 |
| Aqueous solution of urethane resin 2 | | | | | | | | | | | | | | | | |
| Aqueous solution of urethane resin 3 | | | | | | | | | | | | | | | | |
| Aqueous solution of urethane resin 4 | | | | | | | | | | | | | | | | |
| Aqueous solution of urethane resin 5 | | | | | | | | | | | | | | | | |
| Aqueous solution of urethane resin 6 | | | | | | | | | | | | | | | | |
| Aqueous solution of urethane resin 7 | | | | | | | | | | | | | | | | |
| Aqueous solution of urethane resin 8 | | | | | | | | | | | | | | | | |
| Aqueous solution of urethane resin 9 | | | | | | | | | | | | | | | | |
| Aqueous solution of urethane resin 10 | | | | | | | | | | | | | | | | |
| Aqueous solution of urethane resin 11 | | | | | | | | | | | | | | | | |
| Aqueous solution of urethane resin 12 | | | | | | | | | | | | | | | | |
| Aqueous solution of urethane resin 13 | | | | | | | | | | | | | | | | |
| Aqueous dispersion of urethane resin particles | | | | | | | | | | | | | | | 1.70 | |
| Compound 1 | 0.25 | | 0.10 | 0.25 | | | | | | | | | | | | 0.25 |
| Compound 2 | | | | | | | | | | | | | | | | |
| Compound 3 | | | | | | | | | | | | | | | | |
| Compound 4 | | | | | | | | | | | | | | | | |
| Compound 5 | | | | | | | | | | | | | | | | |
| Compound 6 | | | | | | | | | | | | | | | | |
| Compound 7 | | | | | | | | | | | | | | | | |
| Compound 8 | | | | | | 0.25 | | | | | | | | | | |
| Compound 9 | | | | | | | 0.25 | | | | | | | | | |
| BYK 347 | | | | | | | | 0.25 | | | | | | | | |
| BYK 348 | | | | | | | | | 0.25 | | | | | | 0.10 | |
| Compound 10 | | | | | | | | | | | | | | | | |
| Compound 11 | | | | | | | | | | | | | | | | |
| Compound 12 | | | | | | | | | | | | | | | | |
| Compound 13 | | | | | | | | | | | | | | | | |
| Compound 14 | | | | | | | | | | | 0.25 | | | | | |
| Compound 15 | | | | | | | | | | | | 0.25 | | | | |
| BYK 333 | | | | | | | | | | | | | 0.25 | | | |
| Compound 16 | | | | | | | | | | | | | | | | |
| Compound 17 | | | | | | | | | | | | | | | | |
| Compound 18 | | | | | | | | | | | | | | | | |
| Compound 19 | | | | | | | | | | | | | | 0.25 | | |
| Compound 20 | | | | | | | | | | | | | | | 0.25 | |
| Fluorinated surfactant | | | | | | | | | | | | | | | | 1.70 |
| Aqueous solution of acrylic resin | 8.00 | 8.00 | 8.00 | 8.00 | 8.00 | 8.00 | 8.00 | 8.00 | 8.00 | 8.00 | 8.00 | 8.00 | 8.00 | 8.00 | | 8.00 |
| Acetylenol E 100 | 1.00 | 1.00 | 1.00 | 1.00 | 1.00 | 1.00 | 1.00 | 1.00 | 1.00 | 1.00 | 1.00 | 1.00 | 1.00 | 1.00 | | 1.00 |
| Pure water | 56.75 | 57.00 | 56.90 | 60.75 | 61.00 | 59.75 | 59.75 | 59.75 | 59.75 | 59.75 | 59.75 | 59.75 | 59.75 | 59.75 | 47.90 | 58.05 |
| Content $P_2$ (%) of pigment | 1.00 | 1.00 | 1.00 | 1.00 | 1.00 | 1.00 | 1.00 | 1.00 | 1.00 | 1.00 | 1.00 | 1.00 | 1.00 | 1.00 | 3.00 | 1.00 |
| Content $U_2$ (%) of urethane resin | 0.40 | 0.40 | 0.40 | 0.00 | 0.00 | 0.10 | 0.10 | 0.10 | 0.10 | 0.10 | 0.10 | 0.10 | 0.10 | 0.10 | 0.00 | 0.10 |
| Content $S_2$ (%) of Si compound | 0.25 | 0.00 | 0.10 | 0.25 | 0.00 | 0.25 | 0.25 | 0.25 | 0.25 | 0.25 | 0.25 | 0.25 | 0.25 | 0.25 | 0.10 | 0.25 |

<Evaluations>

Inks shown in Tables 7-1 and 7-2 were combined to prepare ink sets, and the following evaluations were carried out. Ink cartridges filled with the inks were installed in an ink jet recording apparatus equipped with a recording head that ejects inks by thermal energy (trade name "PIXUS PRO-10", manufactured by Canon). In Examples, the solid image recorded in conditions in which an ink having a weight of 30.4 ng is applied to a unit area of 1/600 inch×1/600 inch at a resolution of 2,400 dpi×1,200 dpi is defined as "a recording duty of 100%". Onto a recording medium (trade name "Canon Photo Paper, glossy professional [Platinum Grade]", manufactured by Canon), the first ink and the second ink were applied so as to overlap with each other at a first ink recording duty of 50% and a second ink recording duty of 50%, giving a solid image having a total recording duty of 100%. In the present invention, a sample evaluated as "A" or "B" was regarded as an acceptable level, and a sample evaluated as "C" was regarded as an unacceptable level based on the following criteria of each item.

(Abrasion Resistance)

The obtained solid image was air-dried at normal temperature for 1 hour, and then the surface of the solid image was lightly rubbed with the surface of a nail several times.

Then, the solid image was visually observed to evaluate the abrasion resistance based on the following criteria.
A: Glossiness was not changed in the rubbed area.
B: Unnoticeable glossiness change was observed in the rubbed area.
C: Noticeable glossiness change was observed in the rubbed area.

(Gloss Clarity)

The obtained solid image was air-dried at normal temperature for 24 hours. The dried solid image was then evaluated in the following manner. Two fluorescent lights disposed at an interval of 10 cm were used as observation light sources and were projected on the image 2 m apart. The shapes of the fluorescent lights projected on the image were visually observed in conditions of a lighting angle of 45 degrees and an observation angle of 45 degrees, and the gloss clarity of the image was evaluated based on the following criteria.
A: The boundary between two projected fluorescent lights was observed, and the edges were not blurred.
B: The boundary between two projected fluorescent lights were observed, but the edges were slightly blurred.
C: The boundary between two projected fluorescent lights was unclear.

TABLE 7-1

Constitutions and evaluation results of ink sets

| | | Constitution of ink set | | | | Evaluation result | |
|---|---|---|---|---|---|---|---|
| | | First ink | Second ink | Relation of $P_1 > P_2$ | Relation of $U_1 > U_2$ | Relation of $S_1 < S_2$ | Abrasion resistance | Gloss clarity |
| Example | 1 | I-1 | II-1 | ○ | ○ | ○ | A | A |
| | 2 | I-2 | II-2 | ○ | ○ | ○ | A | A |
| | 3 | I-3 | II-3 | ○ | ○ | ○ | A | A |
| | 4 | I-4 | II-4 | ○ | ○ | ○ | A | A |
| | 5 | I-5 | II-5 | ○ | ○ | ○ | A | A |
| | 6 | I-6 | II-6 | ○ | ○ | ○ | A | A |
| | 7 | I-7 | II-7 | ○ | ○ | ○ | A | A |
| | 8 | I-1 | II-8 | ○ | ○ | ○ | A | A |
| | 9 | I-1 | II-9 | ○ | ○ | ○ | A | A |
| | 10 | I-1 | II-10 | ○ | ○ | ○ | A | A |
| | 11 | I-1 | II-11 | ○ | ○ | ○ | A | A |
| | 12 | I-1 | II-12 | ○ | ○ | ○ | A | A |
| | 13 | I-8 | II-1 | ○ | ○ | ○ | A | A |
| | 14 | I-8 | II-13 | ○ | ○ | ○ | A | A |
| | 15 | I-9 | II-1 | ○ | ○ | ○ | A | A |
| | 16 | I-10 | II-1 | ○ | ○ | ○ | A | B |
| | 17 | I-1 | II-14 | ○ | ○ | ○ | B | A |
| | 18 | I-1 | II-15 | ○ | ○ | ○ | B | A |
| | 19 | I-1 | II-16 | ○ | ○ | ○ | B | A |
| | 20 | I-1 | II-17 | ○ | ○ | ○ | B | A |
| | 21 | I-1 | II-18 | ○ | ○ | ○ | B | A |
| | 22 | I-1 | II-19 | ○ | ○ | ○ | B | A |
| | 23 | I-1 | II-20 | ○ | ○ | ○ | B | A |
| | 24 | I-1 | II-21 | ○ | ○ | ○ | B | A |
| | 25 | I-11 | II-22 | ○ | ○ | ○ | B | B |
| | 26 | I-12 | II-23 | ○ | ○ | ○ | B | B |
| | 27 | I-13 | II-24 | ○ | ○ | ○ | A | B |
| | 28 | I-14 | II-25 | ○ | ○ | ○ | A | B |
| | 29 | I-15 | II-26 | ○ | ○ | ○ | A | B |
| | 30 | I-16 | II-27 | ○ | ○ | ○ | A | B |
| | 31 | I-1 | II-28 | ○ | ○ | ○ | A | B |
| | 32 | I-7 | II-1 | ○ | ○ | ○ | A | B |
| | 33 | I-17 | II-1 | ○ | ○ | ○ | A | A |
| | 34 | I-18 | II-1 | ○ | ○ | ○ | B | B |
| | 35 | I-9 | II-10 | ○ | ○ | ○ | B | A |
| | 36 | I-9 | II-15 | ○ | ○ | ○ | B | A |
| | 37 | I-19 | II-1 | ○ | ○ | ○ | A | B |
| | 38 | I-20 | II-1 | ○ | ○ | ○ | A | B |
| | 39 | I-21 | II-15 | ○ | ○ | ○ | B | B |

TABLE 7-2

Constitution and evaluation result of ink sets

| | | Constitution of ink set | | | | Evaluation result | |
|---|---|---|---|---|---|---|---|
| | | First ink | Second ink | Relation of $P_1 > P_2$ | Relation of $U_1 > U_2$ | Relation of $S_1 < S_2$ | Abrasion resistance | Gloss clarity |
| Comparative Example | 1 | I-1 | II-29 | ○ | ○ | x | C | C |
| | 2 | I-22 | II-1 | ○ | ○ | x | A | C |
| | 3 | I-22 | II-29 | ○ | ○ | x | B | C |
| | 4 | I-22 | II-30 | ○ | ○ | x | C | C |

TABLE 7-2-continued

Constitution and evaluation result of ink sets

| | First ink | Second ink | Relation of $P_1 > P_2$ | Relation of $U_1 > U_2$ | Relation of $S_1 < S_2$ | Abrasion resistance | Gloss clarity |
|---|---|---|---|---|---|---|---|
| 5 | I-23 | II-31 | ○ | x | ○ | B | C |
| 6 | I-24 | II-32 | ○ | x | x | B | C |
| 7 | I-1 | II-31 | ○ | x | ○ | B | C |
| 8 | I-22 | II-31 | ○ | x | x | A | C |
| 9 | I-25 | II-33 | ○ | x | x | C | C |
| 10 | I-26 | II-34 | ○ | x | ○ | A | C |
| 11 | I-26 | II-35 | ○ | x | x | C | C |
| 12 | I-1 | II-36 | ○ | ○ | ○ | C | B |
| 13 | I-1 | II-37 | ○ | ○ | ○ | A | C |
| 14 | I-1 | II-38 | ○ | ○ | ○ | C | B |
| 15 | I-1 | II-39 | ○ | ○ | ○ | C | B |
| 16 | I-1 | II-40 | ○ | ○ | ○ | C | B |
| 17 | I-1 | II-41 | ○ | ○ | ○ | B | C |
| 18 | I-1 | II-42 | ○ | ○ | ○ | C | B |
| 19 | I-1 | II-43 | ○ | ○ | ○ | C | B |
| 20 | I-1 | II-44 | ○ | ○ | ○ | B | C |
| 21 | I-27 | II-45 | ○ | x | x | C | C |
| 22 | I-28 | II-46 | ○ | ○ | x | A | C |

The gloss clarity in Examples 37 and 38 were evaluated as rank B, and Example 37 was comparatively good. The symbol "○" satisfies the Relations as mentioned in the Table. The symbol "x" does not satisfy the Relation as mentioned in the Table.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-012063, filed Jan. 26, 2015, which is hereby incorporated by reference herein in its entirety.

What is claimed is:

1. An aqueous ink set comprising:
a combination of a first ink and a second ink,
the first ink containing a pigment, a resin dispersant, and a water-soluble urethane resin,
the second ink containing a pigment, a resin dispersant, and a water-soluble urethane resin,
the second ink further containing a polyether-modified siloxane compound having a weight-average molecular weight of 10,000 or more to 50,000 or less,
a content $P_1$ (% by mass) of the pigment in the first ink being larger than a content $P_2$ (% by mass) of the pigment in the second ink,
a content $U_1$ (% by mass) of the water-soluble urethane resin in the first ink being larger than a content $U_2$ (% by mass) of the water-soluble urethane resin in the second ink,
a content $S_1$ (% by mass) of a polyether-modified siloxane compound in the first ink being smaller than a content $S_2$ (% by mass) of the polyether-modified siloxane compound in the second ink.

2. The ink set according to claim 1, wherein the content $S_1$ (% by mass) of the polyether-modified siloxane compound in the first ink is 0.10% by mass or less.

3. The ink set according to claim 1, wherein the polyether-modified siloxane compound has an HLB value of 9 or more.

4. The ink set according to claim 1, wherein the polyether-modified siloxane compound is represented by General Formula (1):

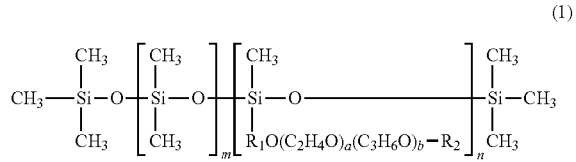

(in General Formula (1), $R_1$ is an alkylene group having 1 or more to 20 or less carbon atoms; $R_2$ is a hydrogen atom or an alkyl group having 1 or more to 20 or less carbon atoms; m is a number of 1 or more to 350 or less; n is a number of 1 or more to 100 or less; a is a number of 1 or more to 100 or less; and b is a number of 0 or more to 100 or less).

5. An ink jet recording method comprising:
ejecting inks from an ink jet recording head to record an image on a recording medium,
the inks being inks included in an aqueous ink set comprising:
a combination of a first ink and a second ink,
the first ink containing a pigment, a resin dispersant, and a water-soluble urethane resin,
the second ink containing a pigment, a resin dispersant, and a water-soluble urethane resin,
the second ink further containing a polyether-modified siloxane compound having a weight-average molecular weight of 10,000 or more to 50,000 or less,
a content $P_1$ (% by mass) of the pigment in the first ink being larger than a content $P_2$ (% by mass) of the pigment in the second ink,
a content $U_1$ (% by mass) of the water-soluble urethane resin in the first ink being larger than a content $U_2$ (% by mass) of the water-soluble urethane resin in the second ink,
a content $S_1$ (% by mass) of a polyether-modified siloxane compound in the first ink being smaller than a content $S_2$ (% by mass) of the polyether-modified siloxane compound in the second ink.

* * * * *